United States Patent
Nakahori et al.

(10) Patent No.: US 10,663,635 B2
(45) Date of Patent: May 26, 2020

(54) OPTICAL FILM, SHAPING FILM, METHOD FOR MANUFACTURING OPTICAL FILM, AND METHOD FOR MANUFACTURING STRETCHED FILM

(71) Applicant: Zeon Corporation, Chiyoda-ku, Tokyo (JP)

(72) Inventors: Hyota Nakahori, Tokyo (JP); Shunsuke Yamanaka, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 14 days.

(21) Appl. No.: 15/510,753

(22) PCT Filed: Sep. 10, 2015

(86) PCT No.: PCT/JP2015/075715
§ 371 (c)(1),
(2) Date: Mar. 13, 2017

(87) PCT Pub. No.: WO2016/043117
PCT Pub. Date: Mar. 24, 2016

(65) Prior Publication Data
US 2017/0254937 A1    Sep. 7, 2017

(30) Foreign Application Priority Data

Sep. 16, 2014  (JP) ................. 2014-188109

(51) Int. Cl.
*F21V 9/06*     (2018.01)
*G02B 5/20*     (2006.01)
(Continued)

(52) U.S. Cl.
CPC .......... *G02B 5/208* (2013.01); *B29C 48/0018* (2019.02); *B29C 48/0022* (2019.02);
(Continued)

(58) Field of Classification Search
CPC ............ B29C 47/0021; B29C 47/0057; B29C 47/0066; B29C 47/06; B29C 47/062;
(Continued)

(56) References Cited

U.S. PATENT DOCUMENTS 4,917,851 A      4/1990 Yamada et al.
2011/0214699 A1  9/2011 Sasai

FOREIGN PATENT DOCUMENTS

JP  S61283521 A       12/1986
JP  2002249600 A  *   9/2002  ............. B29C 47/06
(Continued)

OTHER PUBLICATIONS

Mar. 21, 2017, International Preliminary Report on Patentability issued in the International Patent Application No. PCT/JP2015/075715.

(Continued)

*Primary Examiner* — Mustak Choudhury
(74) *Attorney, Agent, or Firm* — Kenja IP Law PC

(57) ABSTRACT

The present invention provides an optical film containing an additive. The optical film includes a high concentration portion containing the additive, and a low concentration portion containing the additive at a concentration lower than the high concentration portion. The low concentration portion is provided on both sides of the high concentration portion in a thickness direction of the optical film, and the low concentration portion is provided on both sides of the high concentration portion in a width direction of the optical film.

13 Claims, 8 Drawing Sheets

(51) Int. Cl.
    *B29C 48/08*    (2019.01)
    *B29C 48/00*    (2019.01)
    *B29C 48/21*    (2019.01)
    *B32B 27/00*    (2006.01)
    *B29C 48/18*    (2019.01)
    *B29C 48/19*    (2019.01)
    *B29D 11/00*    (2006.01)
    *B32B 27/08*    (2006.01)
    *G02B 5/30*    (2006.01)
    *B29L 11/00*    (2006.01)
    *B29L 7/00*    (2006.01)
    *B29L 9/00*    (2006.01)
    *B29C 48/315*    (2019.01)
    *B29C 48/30*    (2019.01)
    *B29C 48/31*    (2019.01)
    *B29C 48/49*    (2019.01)
    *B29K 101/12*    (2006.01)

(52) U.S. Cl.
    CPC .............. *B29C 48/08* (2019.02); *B29C 48/18* (2019.02); *B29C 48/19* (2019.02); *B29C 48/21* (2019.02); *B29D 11/00788* (2013.01); *B32B 27/00* (2013.01); *B32B 27/08* (2013.01); *B29C 48/30* (2019.02); *B29C 48/31* (2019.02); *B29C 48/315* (2019.02); *B29C 48/49* (2019.02); *B29C 2793/009* (2013.01); *B29K 2101/12* (2013.01); *B29K 2995/0018* (2013.01); *B29K 2995/0034* (2013.01); *B29L 2007/00* (2013.01); *B29L 2009/00* (2013.01); *B29L 2011/0066* (2013.01); *B32B 2551/00* (2013.01); *G02B 5/30* (2013.01)

(58) Field of Classification Search
    CPC ....... B29C 47/065; B29C 47/16; B29C 47/18; B29C 47/56; B29C 47/88; B32B 27/00; B32B 27/08; B32B 27/30; B29D 11/00788; B29D 11/00798; B29D 11/0073; B29D 11/0074; G02B 5/30; G02B 5/208; G02B 5/0221; G02B 5/0242; G02B 5/0278; G02B 5/0294; G02B 5/305; G02B 5/3083; G02F 1/1335; G02F 1/133502; G02F 1/133528; C08L 45/00; C08L 65/00; C08J 5/18
    USPC ..... 359/282, 359, 361, 485.03, 489.11, 540; 428/35.7, 141, 212, 330, 458, 910, 480, 428/483, 457, 336, 216, 847.1, 1.31; 425/131.1, 133.5, 145, 146, 462; 349/96
    See application file for complete search history.

(56) References Cited

FOREIGN PATENT DOCUMENTS

| JP | 2002249600 A | * | 9/2002 | | |
|----|--------------|---|--------|---|---|
| JP | 2004050405 A | | 2/2004 | | |
| JP | 2008085015 A | | 4/2008 | | |
| JP | 2011051346 A | | 3/2011 | | |
| JP | 2011073389 A | | 4/2011 | | |
| JP | 2012126038 A | * | 7/2012 | ......... | B29C 47/0021 |
| JP | 2012126038 A | * | 7/2012 | ............ | B29C 48/08 |

OTHER PUBLICATIONS

Nov. 17, 2015, International Search Report issued in the International Patent Application No. PCT/JP2015/075715.

* cited by examiner

OPTICAL FILM, SHAPING FILM, METHOD FOR MANUFACTURING OPTICAL FILM, AND METHOD FOR MANUFACTURING STRETCHED FILM

FIELD

The present invention relates to an optical film, a trimmed film, a method for producing an optical film, and a method for producing a stretched film.

BACKGROUND

In general, various optical films are provided to image display devices such as liquid crystal display devices. Such optical films are usually formed of resins. In some cases, additives may be added to the resin which forms the optical films, for imparting appropriate characteristics for adapting to its use (see Patent Literatures 1 and 2).

CITATION LIST

Patent Literature

Patent Literature 1: Japanese Patent Application Laid-Open No. 2004-50405 A
Patent literature 2: Japanese Patent Application Laid-Open No. Sho. 61-283521 A

SUMMARY

Technical Problem

Optical films formed of resins may be produced by, for example, a melt extrusion method. In the melt extrusion method, a resin in a melted state is extruded into a film shape from an appropriate die onto a supporting body such as a casting roll. Then, the extruded resin is cooled to be cured by a cooling apparatus such as a cooling roll to obtain an optical film.

However, when an optical film is produced by the melt extrusion method, the resin in a melted state is at a high temperature. Consequently, additives in the resin may be volatilized in some cases.

The volatilized additives may adhere to a die. When adhesion of the volatilized additives to a lip of a die occurs, the adhering additives may be solidified on the lip to form a lump, and it may cause die lines. Herein, a die line refers to a linear concave or a linear convex generated in an irregular manner and extends in the lengthwise direction of the produced optical film.

The volatilized additives may also adhere to production facilities such as a supporting body and a cooling apparatus, and may cause contamination of a production line. When the production line is contaminated in this manner, the additives adhering to production facilities may be transferred to the surface of the optical film, causing contamination of the surface of the optical film. Further, when the additives adhering to production facilities are solidified to form a lump, the shape of the lump is transferred onto the optical film. This may form dents on the optical film.

The present invention has been created in view of the above-described problems, and it is an object of the present invention to provide: an optical film that contains an additive and can suppress volatilization of the additive during production by a melt extrusion method; a trimmed film that can be produced from the optical film; a method for producing an optical film that contains an additive and can suppress volatilization of the additive during production by a melt extrusion method; and a method for producing a stretched film from the optical film produced by the method for producing an optical film.

Solution to Problem

The present inventor intensively conducted research for solving the above-described problems. As a result, the present inventor has found that when an optical film contains an additive and includes a low concentration portion containing the additive at a concentration lower than a high concentration portion on both sides of a thickness direction and a width direction of the high concentration portion containing the additive, volatilization of the additive contained in the high concentration portion can be suppressed. Thus, the present invention has been achieved.

That is, the present invention is as follows.

(1) An optical film containing an additive, comprising: a high concentration portion containing the additive; and a low concentration portion containing the additive at a concentration lower than the high concentration portion, wherein
the low concentration portion is provided on both sides of the high concentration portion in a thickness direction of the optical film, and
the low concentration portion is provided on both sides of the high concentration portion in a width direction of the optical film.

(2) The optical film according to (1), wherein the optical film is produced by a melt extrusion method.

(3) The optical film according to (1) or (2), wherein the low concentration portion is exposed on surfaces in the thickness direction and surfaces in the width direction of the optical film.

(4) The optical film according to any one of (1) to (3), wherein
the high concentration portion contains a thermoplastic resin A containing the additive, and
the low concentration portion contains a thermoplastic resin B containing the additive at a concentration lower than the concentration of the additive in the thermoplastic resin A.

(5) The optical film according to any one of (1) to (4), wherein
surfaces of the high concentration portion in the thickness direction of the optical film are covered with the low concentration portion, and
surfaces of the high concentration portion in the width direction of the optical film are covered with the low concentration portion.

(6) The optical film according to any one of (1) to (5), wherein the optical film is a long-length film.

(7) The optical film according to any one of (1) to (6), wherein the optical film has a region where the high concentration portion has a thickness of "average thickness of the high concentration portion ±5 μm" in a continuous section having a length of 500 mm or more in the width direction of the optical film.

(8) The optical film according to any one of (1) to (7), wherein the additive is an ultraviolet absorber.

(9) The optical film according to any one of (1) to (8), wherein the optical film is a primary film for tenter stretching.

(10) A trimmed film obtained by cutting off, from the optical film according to any one of (1) to (9), end portions in the width direction of the optical film.

(11) A method for producing an optical film, comprising the step of extruding a thermoplastic resin A containing an additive and a thermoplastic resin B containing the additive at a concentration lower than the thermoplastic resin A into a film shape from a die filled with a layer of the melted thermoplastic resin A and a layer of the melted thermoplastic resin B, the melted thermoplastic resin B being provided on both sides in a thickness direction and both sides in a width direction of the layer of the thermoplastic resin A.

(12) A method for producing a stretched film, comprising the steps of:

supplying the optical film produced by the production method according to (11) to a tenter stretching machine including grippers;

stretching the optical film while holding both end portions in the width direction of the optical film with the grippers of the tenter stretching machine to obtain a stretched film; and cutting off both the end portions from the obtained stretched film.

(13) A method for producing a stretched film, comprising the steps of:

cutting off both end portions in the width direction of the optical film produced by the production method according to (11) to obtain a trimmed film; and supplying the obtained trimmed film to a tenter stretching machine, and stretching the trimmed film to obtain a stretched film.

(14) The method for producing the stretched film according to (12) or (13), wherein the content of the additive in the stretched film is approximately constant along a width direction.

(15) The method for producing the stretched film according to any one of (12) to (14), wherein a concentration of the additive in the thermoplastic resin A is 3% by weight or more and 10% by weight or less.

Advantageous Effects of Invention

According to the present invention, there can be provided: an optical film that contains an additive and can suppress volatilization of the additive during production by a melt extrusion method; a trimmed film that can be produced from the optical film; a method for producing an optical film that contains an additive and can suppress volatilization of the additive during production by a melt extrusion method; and a method for producing a stretched film from the optical film produced by the production method.

DESCRIPTION OF EMBODIMENTS

Although the present invention will be described below in detail by way of embodiments and examples, the present invention is not limited to the embodiments, the examples, and the like described below and may be freely modified and practiced without departing from the scope of the claims of the present invention and equivalents thereto.

In the following description, an in-plane retardation of a film is a value represented by $(nx-ny) \times d$, unless otherwise stated. Further, a thickness-direction retardation of a film is a value represented by $\{(nx+ny)/2-nz\} \times d$, unless otherwise stated. In the formulas, nx represents a refractive index in a direction in which the maximum refractive index is given among directions perpendicular to a thickness direction of the film (in-plane direction), ny represents a refractive index in one of the above-mentioned in-plane directions that is perpendicular to the direction giving nx, nz represents a refractive index in a thickness direction of the film, and d represents the thickness of the film. The above-mentioned retardation may be measured with a commercially available phase difference measurement apparatus (for example, "KOBRA-21ADH" manufactured by Oji Scientific Instruments and "WPA-micro" manufactured by Photonic Lattice, Inc.) or a Senarmont method. The measurement wavelength of retardation is 550 nm unless otherwise stated.

[1. Configuration of Optical Film]

Figure 1:
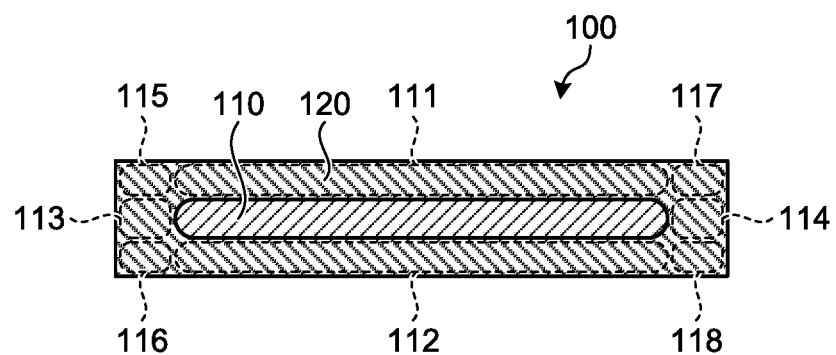
FIG. 1 is a cross-sectional view schematically illustrating a cross section taken along a plane parallel to the thickness direction and the width direction of an optical film according to an embodiment of the present invention.

FIG. 1 is a cross-sectional view schematically illustrating a cross section taken along a plane parallel to the thickness direction and the width direction of an optical film 100 according to an embodiment of the present invention.

As illustrated in FIG. 1, the optical film 100 according to the embodiment of the present invention is a film containing an additive, and the film includes a high concentration portion 110 and a low concentration portion 120. Herein, the high concentration portion 110 refers to a portion of the optical film 100, which contains an additive. The low concentration portion 120 refers to a portion of the optical film 100, which contains an additive at a concentration lower than the high concentration portion 110. The low concentration portion 120 may contain the additive at a concentration lower than the high concentration portion 110, or may not contain the additive. Therefore, the concentration of the additive in the high concentration portion 110 is relatively high, and the concentration of the additive in the low concentration portion 120 is relatively low.

The optical film 100 according to the present embodiment includes the low concentration portion 120 on both sides of the high concentration portion 110 in the thickness direction of the optical film 100. Specifically, in the example illustrated in FIG. 1, the optical film 100 includes the low concentration portion 120 on both a front-side region 111 and a back-side region 112 of the high concentration portion 110 in the thickness direction of the optical film 100.

The optical film 100 according to the present embodiment includes the low concentration portion 120 on both sides of the high concentration portion 110 in the width direction of the optical film 100. Specifically, in the example illustrated in FIG. 1, the optical film 100 includes the low concentration portion 120 on both a left-side region 113 and a right-side region 114 of the high concentration portion 110 in the width direction of the optical film 100.

By having such a configuration, the entire circumference of the high concentration portion 110 containing the additive at a relatively high concentration can be confined by the low concentration portion 120 containing the additive at a relatively low concentration. With this configuration, even when the additive contained in the high concentration portion 110 is volatilized in a high temperature environment and is about to go out of the optical film 100, the low concentration portion 120 obstructs travel of the additive. Thus, according to the optical film 100 of the present embodiment, the additive can be prevented from being volatilized to leak out of the optical film 100. This can suppress the formation of die lines on the optical film, the contamination of the surface of the optical film, and the formation of dents on the optical film, which are attributable to the volatilized additive.

There has been known a multilayer film which includes a core layer containing an additive at a relatively high concentration and skin layers that contain an additive at a concentration lower than the core layer provided on both sides in the thickness direction of this core layer. Since the skin layers of the multilayer film block the travel of the additive, it is possible to suppress volatilization of the additive through the main surface of the multilayer film. However, in the multilayer film, the core layer is exposed on the end portions in the width direction of the multilayer film. As a result, in a high temperature environment where a resin is melted, for example, during melt extrusion, the additive in the core layer is volatilized from the end surfaces at the ends in the width direction of the multilayer film and leaked out of the multilayer film in some cases. However, in the optical film 100 according to the present embodiment, the high concentration portion 110 is not exposed on both surfaces in the thickness direction and the width direction of the optical film 100. As a result, leakage of the additives out of the high concentration portion 110 can be suppressed effectively. Accordingly, volatilization of the additive can be suppressed.

The optical film 100 according to the present embodiment may have an optional portion in regions 115, 116, 117, and 118 which are not either both sides in the thickness direction of the optical film 100 or both sides in the width direction of the optical film 100, as long as the effects of the present invention is not significantly impaired. Usually, the optical film 100 has the low concentration portion 120 in the regions 115, 116, 117, and 118.

Figure 2:
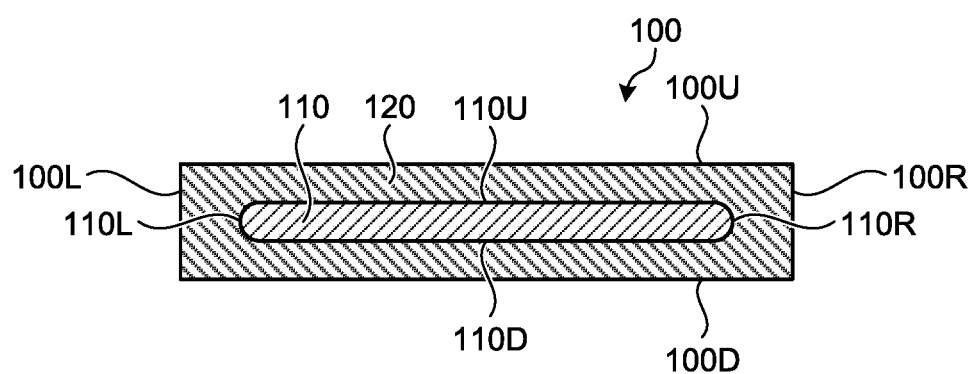
FIG. 2 is a cross-sectional view schematically illustrating a cross section taken along a plane parallel to the thickness direction and the width direction of an optical film according to an embodiment of the present invention.

FIG. 2 is a cross-sectional view schematically illustrating a cross section taken along a plane parallel to the thickness direction and the width direction of an optical film 100 according to an embodiment of the present invention.

The optical film 100 may include an optional portion (not shown) between the high concentration portion 110 and the low concentration portion 120. However, it is preferable that, as illustrated in FIG. 2, the high concentration portion 110 and the low concentration portion 120 are in direct contact with each other without disposing an optional portion between the high concentration portion 110 and the low concentration portion 120. In this case, surfaces 110D and 110U of the high concentration portion 110 in the thickness direction of the optical film 100 can be covered with the low concentration portion 120, and surfaces 110L and 110R of the high concentration portion 110 in the width direction of the optical film 100 can be covered with the low concentration portion 120. Accordingly, volatilization of the additive can be suppressed. This can suppress the contamination of the optical film 100 caused by adherence of volatilized matter, the generation of die lines caused by adherence of the volatilized matter to the lip of the die, and the marks transferred onto the optical film 100 caused by adherence of the volatilized matter to the casting roll.

The optical film 100 may include an optional portion (not shown) outside the low concentration portion 120. However, it is preferable that an optional portion is not provided outside the low concentration portion 120 of the optical film 100. In this case, the low concentration portion 120 can be exposed on surfaces 100D and 100U in the thickness direction and surfaces 100L and 100R in the width direction of the optical film 100. With the optical film 100 having such a configuration, the low concentration portion 120 can be brought into contact with the facilities provided in a production line. Therefore, when the optical film 100 comes into contact with the facilities, contamination of the facilities by the additive can be effectively suppressed.

The concentration of the additive in the high concentration portion 110, relative to 100% by weight of the entire material contained in the high concentration portion 110, is preferably 3% by weight or more, more preferably 4% by weight or more, and particularly preferably 5% by weight or more, and is preferably 10% by weight or less, more preferably 9% by weight or less, and particularly preferably 8% by weight or less. When the concentration of the additive in the high concentration portion 110 is equal to or more than the lower limit value of the above-mentioned range, a desired function to be exhibited by the additive can be effectively exhibited. When it is equal to or less than the upper limit value, volatilization of the additive can be stably suppressed even when the low concentration portion 120 is thin. Therefore, the optical film 100 can have a reduced thickness.

The concentration of the additive in the high concentration portion 110 is usually uniform. However, the concentration of the additive in the high concentration portion 110 is not necessarily uniform, and, for example, the high concentration portion 110 may have a concentration gradient. When the concentration of the additive in the high concentration portion 110 is not uniform, the average concentration of the additive in the high concentration portion 110 desirably falls within the above-mentioned preferable range for the concentration of the additive in the high concentration portion 110.

The concentration of the additive in the low concentration portion 120, relative to 100% by weight of the entire material contained in the low concentration portion 120, is preferably 1% by weight or less, more preferably 0.5% by weight or less, further preferably 0.1% by weight or less, and particularly preferably 0%. When the concentration of the additive in the low concentration portion 120 is low in this manner, volatilization of the additive can be particularly effectively suppressed.

The concentration of the additive in the low concentration portion 120 is usually uniform. However, the concentration of the additive in the low concentration portion 120 is not necessarily uniform, and, for example, the low concentration portion 120 may have a concentration gradient. When the concentration of the additive in the low concentration portion 120 is not uniform, the average concentration of the additive in the low concentration portion 120 desirably falls within the above-mentioned preferable range for the concentration of the additive in the low concentration portion 120.

The concentration difference of the additive between the high concentration portion 110 and the low concentration portion 120 is preferably 3% by weight or more, more preferably 4% by weight or more, and particularly preferably 5% by weight or more. When the concentration difference is made large in this manner, volatilization of the additive can be particularly effectively suppressed. The upper limit value of the concentration difference is not particularly limited, but preferably 10% by weight or less, and more preferably 8% by weight or less.

It is noted that when a concentration gradient is formed between the high concentration portion 110 and the low concentration portion 120, a distinct boundary between the high concentration portion 110 and the low concentration portion 120 cannot be determined in some cases. Even in such cases, the optical film 100 falls within the technical scope of the present invention, as long as the low concentration portion 120 is found on both sides in both the thickness direction and the width direction of the optical film 100 when a certain portion within the optical film 100 is regarded as the high concentration portion 110.

Figure 3:
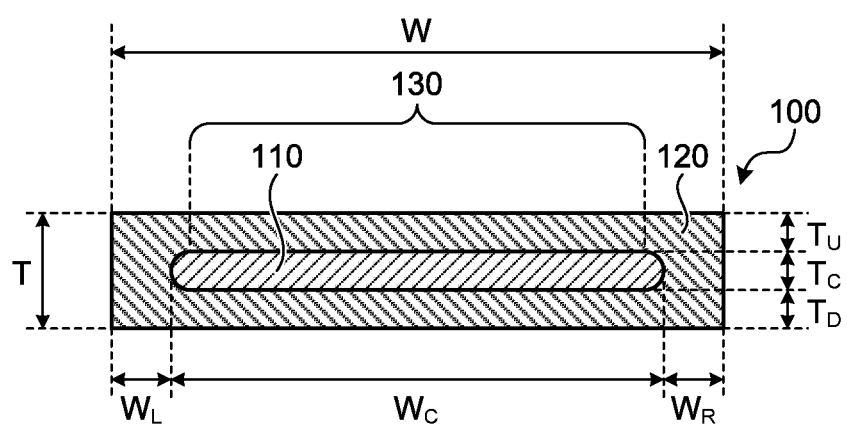
FIG. 3 is a cross-sectional view schematically illustrating a cross section taken along a plane parallel to the thickness direction and the width direction of an optical film according to an embodiment of the present invention.

FIG. 3 is a cross-sectional view schematically illustrating a cross section taken along a plane parallel to the thickness direction and the width direction of the optical film 100 according to an embodiment of the present invention.

As illustrated in FIG. 3, a width $W_C$ of the high concentration portion 110 is preferably 500 mm or more, more preferably 800 mm or more, and particularly preferably 1000 mm or more. When the width $W_C$ of the high concentration portion 110 is equal to or more than the lower limit value of the above-mentioned range, production efficiency can be enhanced. The upper limit value of the width $W_C$ of the high concentration portion 110 is not particularly limited, but the practical range in terms of industrial production is preferably 2000 mm or less, more preferably 1700 mm or less, and particularly preferably 1500 mm or less.

A thickness $T_C$ of the high concentration portion 110 is preferably 3 μm or more, more preferably 5 μm or more, and particularly preferably 8 μm or more, and is preferably 100 μm or less, more preferably 70 μm or less, and particularly preferably 50 μm or less. When the thickness $T_C$ of the High Concentration Portion 110 is Equal to or more than the lower limit value of the above-mentioned range, the function of the additive can be effectively exhibited. When it is equal to or less than the upper limit value, the thickness of the optical film 100 can be reduced.

In the optical film 100, the high concentration portion 110 preferably has a region 130 having a thickness of "average thickness of the high concentration portion 110 ±5 μm" in a continuous section in the width direction of the optical film 100. Hereinafter, this region 130 may be appropriately referred to as a "uniform thickness region". Here, the width of the continuous section is preferably 500 mm or more, more preferably 1000 mm or more, and particularly preferably 1300 mm or more. When the thickness of the high concentration portion 110 is uniform in the uniform thickness region 130 which is continuous and wide, the optical film 100 can have an increased area usable as a product, thereby enhancing production efficiency. Such a high concentration portion 110 having a uniform thickness can be achieved by, for example, a production method using a feed block described later.

Widths $W_L$ and $W_R$ of the low concentration portion 120 on both sides of the high concentration portion 110 in the width direction of the optical film 100 are each preferably 1 μm or more, more preferably 2 μm or more, and particularly preferably 3 μm or more, and is preferably 100 mm or less, more preferably 80 mm or less, and particularly preferably 50 mm or less. When the widths $W_L$ and $W_R$ of the low concentration portion 120 are equal to or more than the lower limit value of the above-mentioned range, volatilization of the additive can be particularly effectively suppressed. When it is equal to or less than the upper limit value, the optical film 100 including the high concentration portion 110 having small fluctuations in thickness can be obtained. Since the optical film 100 can have an increased area usable as a product, production efficiency can be enhanced. Regarding this feature, the width $W_L$ of the low concentration portion 120 provided on one side of the high concentration portion 110 in the width direction of the optical film 100 may be the same as or different from the width $W_R$ of the low concentration portion 120 provided on the opposite side.

Widths $T_U$ and $T_D$ of the low concentration portion 120 on both sides of the high concentration portion 110 in the thickness direction of the optical film 100 are each preferably 1 μm or more, more preferably 2 μm or more, and particularly preferably 3 μm or more, and is preferably 30 μm or less, more preferably 20 μm or less, and particularly preferably 10 μm or less. When the thicknesses $T_U$ and $T_D$ of the low concentration portion 120 are equal to or more than the lower limit value of the above-mentioned range, volatilization of the additive can be effectively suppressed. When it is equal to or less than the upper limit value, the thickness of the optical film 100 can be reduced. Regarding this feature, the thickness $T_U$ of the low concentration portion 120 provided on one side of the high concentration portion 110 in the thickness direction of the optical film 100 may be the same as or different from the width $T_D$ of the low concentration portion 120 provided on the opposite side.

The width W of the optical film 100 is preferably 600 mm or more, more preferably 1100 mm or more, and particularly preferably 1400 mm or more, and is preferably 2000 mm or less, more preferably 1900 mm or less, and particularly preferably 1800 mm or less.

The thickness T of the optical film 100 is preferably 5 μm or more, more preferably 8 μm or more, and particularly preferably 10 μm or more, and is preferably 100 μm or less, more preferably 80 μm or less, and particularly preferably 50 μm or less.

The optical film 100 is preferably a long-length film. Herein, the term "long-length" refers to a film having a length of 5 times or more, and preferably 10 times or more the film width, and specifically refers to an film having a length such that it is wound to be in a shape of a roll to be stored or transported. With this feature, the production efficiency of the optical film 100 can be enhanced.

The above-mentioned optical film 100 is usually a film of a thermoplastic resin. Therefore, in the optical film 100, the high concentration portion 110 is usually a portion that includes a thermoplastic resin A containing an additive, and the low concentration portion 120 is usually a portion that includes a thermoplastic resin B containing an additive at a concentration lower than the thermoplastic resin A.

As the thermoplastic resin A, a resin that contains a polymer and an additive, and as necessary, an optional component, is usually used.

Examples of the polymer to be contained in the thermoplastic resin A may include polyolefin such as polyethylene and polypropylene; polyester such as polyethylene terephthalate and polybutylene terephthalate; polyarylene sulfide such as polyphenylene sulfide; polyvinyl alcohol; polycarbonate; polyalylate; cellulose ester polymers; polyether sulfone; polysulfone; polyallyl sulfone; polyvinyl chloride; cyclic olefin polymers; rod-like liquid crystal polymers; polystyrene-based polymers including homopolymers of styrene or styrene derivatives, or copolymers of styrene or styrene derivatives and comonomers copolymerizable with styrene or styrene derivatives; polyacrylonitrile, polymethyl methacrylate; and multicomponent copolymers thereof. One type thereof may be used alone, and two or more types thereof may also be used in combination at any ratio.

Of these, the cyclic olefin polymers are preferable, because they are excellent in mechanical characteristics, heat resistance, transparency, low hygroscopicity, size stability, and lightweight property. The cyclic olefin polymer is a polymer of a structural unit having an alicyclic structure.

The cyclic olefin polymer may be a polymer having an alicyclic structure in a main chain, a polymer having an alicyclic structure in a side chain, a polymer having alicyclic structures in a main chain and a side chain, and a mixture of two or more of these polymers at any ratio. Of these, the polymer having an alicyclic structure in a main chain is preferable from the viewpoint of mechanical strength and heat resistance.

Examples of the alicyclic structure may include a saturated alicyclic hydrocarbon (cycloalkane) structure and an unsaturated alicyclic hydrocarbon (cycloalkene and cycloalkyne) structure. Of these, the cycloalkane structure and the cycloalkene structure are preferable from the viewpoint of mechanical strength and heat resistance. Of these, the cycloalkane structure is particularly preferable.

The number of carbon atoms constituting the alicyclic structure is preferably 4 or more, and more preferably 5 or more, and is preferably 30 or less, more preferably 20 or less, and particularly preferably 15 or less, per alicyclic structure. When the number of carbon atoms constituting the alicyclic structure falls within this range, mechanical strength, heat resistance, and moldability of the thermoplastic resin A is highly balanced.

In the cyclic olefin polymer, the ratio of the structural unit having the alicyclic structure may be selected in conformity with the purpose of use of the optical film 100. The ratio of the structural unit having the alicyclic structure in the cyclic olefin polymer is preferably 55% by weight or more, further preferably 70% by weight or more, and particularly preferably 90% by weight or more. When the ratio of the structural unit having the alicyclic structure in the cyclic olefin polymer falls within this range, transparency and heat resistance of the thermoplastic resin A become favorable.

Of the cyclic olefin polymers, a cycloolefin polymer is preferable. The cycloolefin polymer is a polymer having a structure that is obtained by polymerizing a cycloolefin monomer. Further, the cycloolefin monomer is a compound having a ring structure formed of carbon atoms and also having a polymerizable carbon-carbon double bond in the ring structure. Examples of the polymerizable carbon-carbon double bond may include a carbon-carbon double bond that can be polymerized in such a manner as a ring opening polymerization. Further, examples of the ring structure of the cycloolefin monomer may include monocyclic, polycyclic, fused polycyclic, cross-linked cyclic structures, and polycyclic structures that are combinations of the aforementioned structures. Of these, the polycyclic cycloolefin monomer is preferable from the viewpoint of highly balanced characteristics of, for example, dielectric property and heat resistance of the obtained polymer.

Preferable examples of the cycloolefin polymers described above may include a norbornene-based polymer, a monocyclic olefin-based polymer, a cyclic conjugated diene-based polymer, and hydrogenated products thereof. Of these, the norbornene-based polymer is particularly preferable because of its favorable moldability.

Examples of the norbornene-based polymer may include a ring-opening polymer of a monomer having a norbornene structure and a hydrogenated product thereof; and an addition polymer of a monomer having a norbornene structure and a hydrogenated product thereof. Further, examples of the ring-opening polymer of a monomer having a norbornene structure may include a ring-opening homopolymer of one type of a monomer having a norbornene structure, a ring-opening copolymer of two or more types of monomers having norbornene structures, and a ring-opening copolymer of a monomer having a norbornene structure and another monomer copolymerizable therewith. Further, examples of the addition polymer of a monomer having a norbornene structure may include an addition homopolymer of one type of a monomer having a norbornene structure, an addition copolymer of two or more types of monomers having norbornene structures, and an addition copolymer of a monomer having a norbornene structure and another monomer copolymerizable therewith. Of these, a hydrogenated product of the ring-opening polymer of a monomer having a norbornene structure is particularly preferable from the viewpoint of moldability, heat resistance, low hygroscopicity, size stability, lightweight property, and the like.

Examples of the monomer having a norbornene structure may include bicyclo[2.2.1]hept-2-ene (common name: norbornene), tricyclo[4.3.0.1$^{2,5}$]deca-3,7-diene (common name: dicyclopentadiene), 7,8-benzotricyclo[4.3.0.1$^{2,5}$] deca-3-ene (common name: methanotetrahydrofluorene), tetracyclo[4.4.0.1$^{2,5}$.1$^{7,10}$]dodeca-3-ene (common name: tetracyclododecene), and derivatives of these compounds (for example, those having a substituent on the ring). Examples of the substituent herein may include an alkyl group, an alkylene group, and a polar group. Further, a plurality of such substituents may be bonded to the ring and these substituents may be the same or different from each other. As the monomer having a norbornene structure, one type thereof may be used alone, and two or more types thereof may also be used in combination at any ratio.

Examples of the polar group may include a hetero atom and an atomic group having a hetero atom. Examples of the hetero atom may include an oxygen atom, a nitrogen atom, a sulfur atom, a silicon atom, and a halogen atom. Specific examples of the polar group may include a carboxyl group, a carbonyloxycarbonyl group, an epoxy group, a hydroxyl group, an oxy group, an ester group, a silanol group, a silyl group, an amino group, an amide group, an imide group, a nitrile group, and a sulfonic acid group.

Examples of the monomer copolymerizable with the monomer having a norbornene structure through ring-opening copolymerization may include monocyclic olefins such as cyclohexene, cycloheptene, and cyclooctene, and derivatives thereof; and cyclic conjugated dienes such as cyclohexadiene and cycloheptadiene, and derivatives thereof. As the monomer copolymerizable with the monomer having a norbornene structure through ring-opening copolymerization, one type thereof may be used alone, and two or more types thereof may also be used in combination at any ratio.

The ring-opening polymer of a monomer having a norbornene structure may be produced, for example, by polymerizing or copolymerizing such monomers in the presence of a ring-opening polymerization catalyst.

Examples of the monomer addition-copolymerizable with the monomer having a norbornene structure may include α-olefins having 2 to 20 carbon atoms such as ethylene, propylene, and 1-butene, and derivatives thereof; cycloolefins such as cyclobutene, cyclopentene, and cyclohexene, and derivatives thereof; and non-conjugated dienes such as 1,4-hexadiene, 4-methyl-1,4-hexadiene, and 5-methyl-1,4-hexadiene. Of these, the α-olefins are preferable, and ethylene is more preferable. Further, as the monomer addition-copolymerizable with the monomer having a norbornene structure, one type thereof may be used alone, and two or more types thereof may also be used in combination at any ratio.

The addition polymer of a monomer having a norbornene structure may be produced, for example, by polymerizing or copolymerizing such monomers in the presence of an addition polymerization catalyst.

A hydrogenated product of the ring-opening polymer and a hydrogenated product of the addition polymer described above may be produced, for example, by hydrogenating a carbon-carbon unsaturated bond preferably by 90% or more in a solution of the ring-opening polymer and the addition polymer in the presence of a hydrogenation catalyst containing transition metal such as nickel and palladium.

As the norbornene-based polymer, it is preferable that the polymer has an X: bicyclo [3.3.0] octane-2,4-diyl-ethylene structure and a Y: tricyclo [4.3.0.1$^{2,5}$] decane-7,9-diyl-ethylene structure as the structural units, and that the amount of these structural units is 90% by weight or more with respect to the entire structural units of the norbornene-based polymer, and the weight ratio of X and Y is 100:0 to 40:60. By using such a polymer, the optical film 100 containing the norbornene-based polymer can exhibit excellent stability in optical characteristics without having a size change over a long period of time.

Examples of the monocyclic olefin-based polymer may include an addition polymer of a monocyclic olefin-based monomer such as cyclohexene, cycloheptene, and cyclooctene.

Examples of the cyclic conjugated diene-based polymer may include: a polymer obtained by cyclization reaction of an addition polymer of a conjugated diene-based monomer such as 1,3-butadiene, isoprene, and chloroprene; a 1,2- or 1,4-addition polymer of a cyclic conjugated diene-based monomer such as cyclopentadiene and cyclohexadiene; and hydrogenated products thereof.

The weight average molecular weight (Mw) of the cyclic olefin polymer may be suitably selected in conformity with the purpose of use of the optical film 100, but is preferably 10,000 or more, more preferably 15,000 or more, and particularly preferably 20,000 or more, and is preferably 100,000 or less, more preferably 80,000 or less, and particularly preferably 50,000 or less. When the weight average molecular weight is in such a range, mechanical strength and moldability of the optical film 100 are highly balanced. Herein, the above-mentioned weight average molecular weight is measured in terms of polyisoprene or polystyrene by a gel permeation chromatography using cyclohexane as a solvent. In the gel permeation chromatography, if the sample does not dissolve in cyclohexane, toluene may be used as the solvent.

The molecular weight distribution (weight average molecular weight (Mw)/number average molecular weight (Mn)) of the cyclic olefin polymer is preferably 1.2 or more, more preferably 1.5 or more, and particularly preferably 1.8 or more, and is preferably 3.5 or less, more preferably 3.0 or less, and particularly preferably 2.7 or less. By limiting the molecular weight distribution to be equal to or higher than the above-mentioned lower limit value, productivity of the polymer can be improved and production cost can be reduced. Further, by limiting it to be equal to or lower than the upper limit value, the amount of low molecular components is reduced, whereby it is possible to suppress relaxation of the film during high-temperature exposure, and stability of the optical film 100 can thus be improved.

The ratio of the polymer in the thermoplastic resin A is preferably 90% by weight or more, more preferably 91% by weight or more, and particularly preferably 92% by weight or more, and is preferably 97% by weight or less, more preferably 96% by weight or less, and particularly preferably 95% by weight or less. When the ratio of the polymer is equal to or more than the lower limit value of the above-mentioned range, the optical film 100 can exhibit sufficient heat resistance and transparency. When it is equal to or less than the upper limit value, the effect of the additive can be exhibited.

The additive preferably has high volatility to a degree that allows for volatilization at the temperature for the production of the optical film 100 by a melt extrusion method. The additive preferably does not exhibit high volatility under normal temperature conditions. Herein, volatility refers to a property that an additive is gasified and emitted, regardless of whether the additive before the vaporization is a solid or a liquid. "Having high volatility" means that the amount of the additive volatilized and lost from the thermoplastic resin melted for producing the optical film 100, relative to 100% by weight of an entire adding amount of the additive, is usually 1% by weight or more, and preferably 5% by weight or more.

Specific examples of the additive may include an ultraviolet absorber, an antioxidant, a plasticizer, and an anti-aging agent. As the additive, one type thereof may be used alone, and two or more types thereof may also be used in combination at any ratio. Of these, an ultraviolet absorber is preferably used as the additive.

Examples of the ultraviolet absorber may include organic ultraviolet absorbers such as an oxybenzophenone-based compound, a benzotriazole-based compound, a salicylic acid ester-based compound, a benzophenone-based ultraviolet absorber, a benzotriazole-based ultraviolet absorber, an acrylonitrile-based ultraviolet absorber, and a triazine-based compound. Specific examples of suitable ultraviolet absorbers may include 2,2'-methylenebis(4-(1,1,3,3-tetramethylbutyl)-6-(2H-benzotriazole-2-yl)phenol), 2-(2'-hydroxy-3'-tert-butyl-5'-methylphenyl)-5-chlorobenzotriazole, 2,4-di-tert-butyl-6-(5-chlorobenzotriazole-2-yl)phenol, 2,2'-dihydroxy-4,4'-dimethoxybenzophenone, and 2,2',4,4'-tetrahydroxybenzophenone. Of these, 2,2'-methylenebis (4-(1,1,3,3-tetramethylbutyl)-6-(2H-benzotriazole-2-yl) phenol) is particularly suitable.

The concentration of the additive in the thermoplastic resin A may be the concentration in a range that is the same as the above-mentioned range of the concentration of the additive in the high concentration portion 110. Therefore, the concentration of the additive in the thermoplastic resin A may preferably be 3% by weight or more and 10% by weight or less.

An optional component in the thermoplastic resin A is preferably a component which is other than the polymer and has low volatility to such a degree that the component does not volatilize at the temperature for the production of the optical film 100 by a melt extrusion method. As the optional component, one type thereof may be used alone, and two or more types thereof may also be used in combination at any ratio.

The glass transition temperature of the thermoplastic resin A is preferably 100° C. or higher, more preferably 110° C. or higher, and particularly preferably 120° C. or higher, and is preferably 190° C. or lower, more preferably 180° C. or lower, and particularly preferably 170° C. or lower. When the glass transition temperature falls within the above-mentioned range, the optical film 100 having excellent durability can be easily obtained. Furthermore, when a stretched film is produced from the optical film 100, orientation relaxation of the stretched film under a high temperature environment can be effectively suppressed by limiting the glass transition temperature to be equal to or more than the lower limit value of the above-mentioned range. Further, a stretching process can be easily performed by limiting the glass transition temperature to be equal to or less than the upper limit value.

The absolute value of photoelastic coefficient of the thermoplastic resin A is preferably $10 \times 10^{-12}$ $Pa^{-1}$ or less, more preferably $7 \times 10^{-12}$ $Pa^{-1}$ or less, and particularly preferably $4 \times 10^{-12}$ $Pa^{-1}$ or less. When the absolute value of photoelastic coefficient falls within the above-mentioned range, a high-performance optical film 100 can be easily produced. For example, when the optical film 100 is used to produce a stretched film, fluctuations of in-plane retardation in the optical film 100 can be reduced.

Herein, the photoelastic coefficient C is a value represented by $C=\Delta n/\sigma$, where $\Delta n$ is a birefringence and $\sigma$ is a stress.

As the thermoplastic resin B, a resin that contains a polymer and, an additive and an optional component as necessary, may be usually used. As the polymer to be contained in the thermoplastic resin B, for example, a polymer selected from the above-mentioned examples of the polymers to be contained in the thermoplastic resin A may be optionally used. In particular, as the polymer to be contained in the thermoplastic resin B, the same polymer as the polymer contained in the thermoplastic resin A is preferably used. Accordingly, the high concentration portion 110 and the low concentration portion 120 in the optical film 100 can have shrinking properties of approximately the same level. This can suppress deformation such as wrinkles, curls, and deflection of the optical film 100 during temperature changes.

The ratio of the polymer in the thermoplastic resin B is preferably 99.50% by weight or more, more preferably 99.70% by weight or more, and particularly preferably 99.90% by weight or more, and is preferably 100% by weight or less, more preferably 99.98% by weight or less, and particularly preferably 99.95% by weight or less. When the ratio of the polymer falls within the above-mentioned range, characteristics such as transparency and water absorption of the polymer can be maintained.

As the additive to be contained in the thermoplastic resin B, for example, an additive selected from the above-mentioned examples of the additives to be contained in the thermoplastic resin A may be optionally used. However, as the additive contained in the thermoplastic resin B, the same additive as the additive contained in the thermoplastic resin A is usually used.

The concentration of the additive in the thermoplastic resin B may be set to the concentration in a range that is the same as the above-mentioned range for the concentration of the additive in the low concentration portion 120. Therefore, the concentration of the additive in the thermoplastic resin B is preferably as low as possible, and particularly preferably 0% by weight.

The optional component in the thermoplastic resin B is preferably a component other than the polymer and having low volatility to such a degree that the component does not volatilize at the temperature for the production of the optical film 100 by a melt extrusion method. As the optional component, one type thereof may be used alone, and two or more types thereof may also be used in combination at any ratio.

The present embodiment is being described by referring to an example in which the thermoplastic resin B forming the low concentration portion 120 has a uniform composition in any region in the optical film 100. However, the composition of the resin in the low concentration portion 120 may not be necessarily uniform. For example, components contained in the thermoplastic resin B of the low concentration portion 120 in the regions 111 and 112 on both sides of the high concentration portion 110 in the thickness direction of the optical film 100 may be partly or entirely different from those of the low concentration portion 120 in the regions 113 and 114 on both sides of the high concentration portion 110 in the width direction of the optical film 100.

The glass transition temperature of the thermoplastic resin B may fall within a range that is the same as the range described for the glass transition temperature of the thermoplastic resin A. Accordingly, advantages similar to those described on the glass transition temperature of the thermoplastic resin A can be obtained.

The absolute value of the photoelastic coefficient of the thermoplastic resin B may fall within a range that is the same as the range described for the absolute value of the photoelastic coefficient of the thermoplastic resin A. Accordingly, advantages similar to those described for the photoelastic coefficient of the thermoplastic resin A can be obtained.

The saturated water absorption rate of the optical film 100 is preferably 0.05% or less, more preferably 0.03% or less, particularly preferably 0.01% or less, and ideally zero %. By reducing the saturated water absorption rate of the optical film 100 in this manner, it is possible to suppress changes with the lapse of time in optical characteristics of the optical film 100.

The saturated water absorption rate of the film may be measured in accordance with JIS K7209 by the following procedures.

The film is dried at 50° C. for 24 hours and allowed to cool in a desiccator. Then, the weight (M1) of the dried film is measured.

This film is immersed in water for 24 hours in a chamber at a temperature of 23° C. and a relative humidity of 50% for completing saturation of the film with the water. Then, the film is taken out of the water to measure the weight (M2) of the film that has been immersed in the water for 24 hours.

The saturated water absorption rate of the film may be calculated from these measured values of the weight by the following formula.

Saturated water absorption rate (%)=[($M2$−$M1$)/$M1$]× 100(%)

The saturated water absorption rate of the optical film 100 can be confined within the above-mentioned range, for example, by adjusting the type of the polymer in the optical film 100.

The total light transmittance of the optical film 100 is preferably 85% or more, and more preferably 90% or more from the viewpoint of allowing the optical film 100 to stably exert its function as an optical member. The light transmittance may be measured using a spectrophotometer (ultra-violet-visible-near-infrared spectrophotometer "V-570" manufactured by JASCO Corp.,) in accordance with JIS K0115.

The haze of the optical film 100 is preferably 1% or less, more preferably 0.8% or less, and particularly preferably 0.5% or less. When the haze value is small, the clarity of an image displayed by a display device in which the trimmed film or the stretched film manufactured using the optical film 100 is incorporated can be increased. Herein, the haze is an average value calculated from measurement at five points using a "turbidity meter NDH-300A" manufactured by NIPPON DENSHOKU INDUSTRIES CO., LTD. in accordance with JIS K7361-1997.

[2. Method for Producing Optical Film]

The optical film according to the present invention may be produced by a melt extrusion method. For example, when the above-described thermoplastic resin A and thermoplastic resin B are used, the optical film may be produced by a production method including a step of extruding through a die the thermoplastic resin A in a melted state and the thermoplastic resin B in a melted state into a film shape. Hereinafter, an embodiment of this production method will be described with reference to the drawings.

Figure 4:
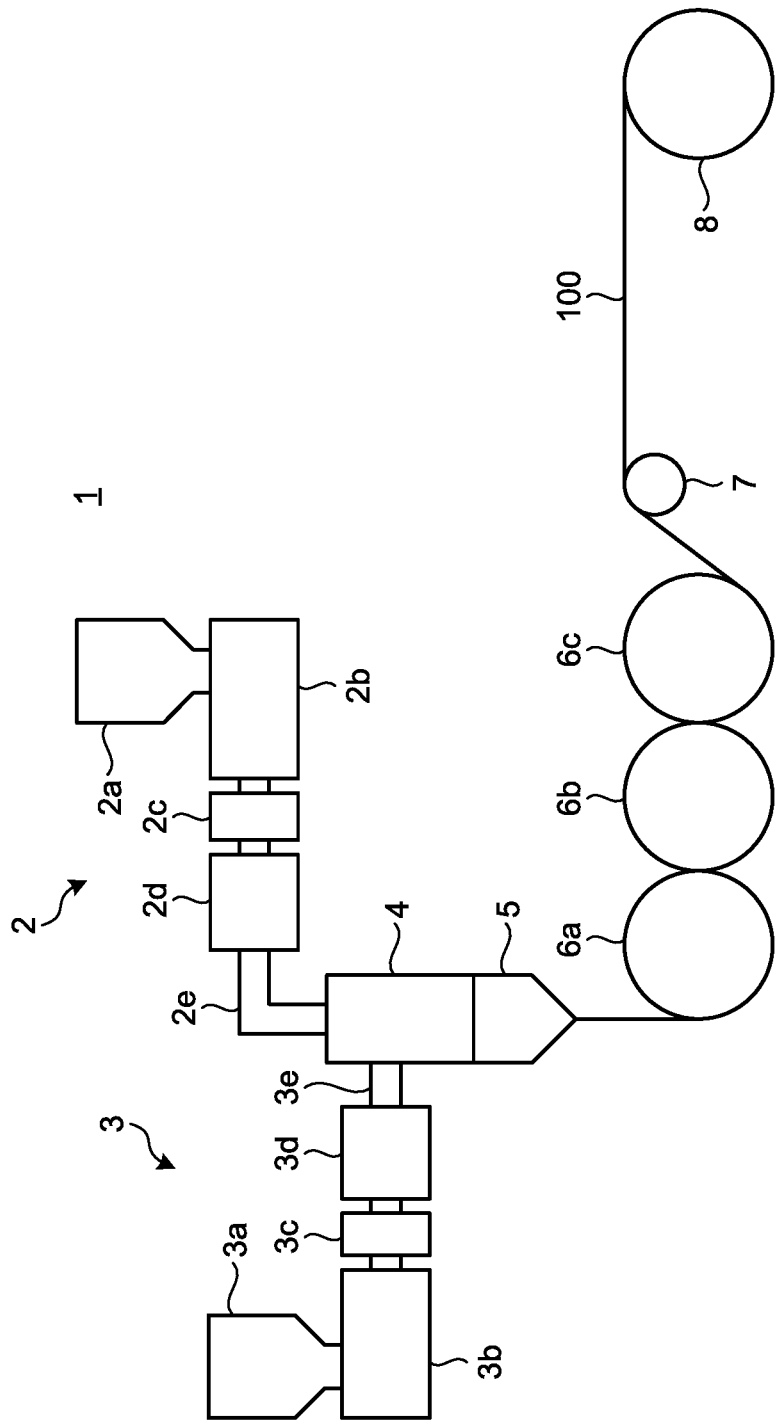
FIG. 4 is a schematic diagram schematically illustrating an apparatus for producing an optical film according to an embodiment of the present invention.

FIG. 4 is a schematic diagram schematically illustrating an apparatus for producing an optical film according to an embodiment of the present invention.

As illustrated in FIG. 4, this production apparatus 1 for producing an optical film has a first melted resin supply system 2 and a second melted resin supply system 3. These melted resin supply systems 2 and 3 respectively include: hoppers 2a and 3a into which resin materials (pellets) containing the thermoplastic resin A and the thermoplastic resin B are respectively supplied; extruders 2b and 3b which respectively heat the resin materials supplied to the hoppers 2a and 3a, for melting and kneading; gear pumps 2c and 3c which respectively supply in a volumetric manner the thermoplastic resin A and the thermoplastic resin B melted by the extruders 2b and 3b; and filters 2d and 3d which remove unmelted foreign matters and the like. A pipe 2e which is capable of supplying the thermoplastic resin A in a melted state from the filter 2d to a feed block 4 as a converging device is connected to the filter 2d. A pipe 3e which is capable of supplying the thermoplastic resin B in a melted state from the filter 3d to the feed block 4 is also connected to the filter 3d. The feed block 4 will be described later in detail.

A die 5 is provided on the downstream side of the feed block 4. This die 5 is a T die for a single layer. Preferably, the die 5 includes a lip portion constituted of a rigid material such as tungsten carbide and plated with chromium or the like to be finished smooth, so that generation of die lines on a film is suppressed. The shape of the die 5 is not particularly limited, and may be, for example, a straight manifold shape, a fish tail shape, and a coat hanger shape. Of these, a coat hanger-shaped die is preferable, because an optical film having less fluctuations in thickness can be produced.

The die 5 is provided to extrude the thermoplastic resin A and thermoplastic resin B in a melted state into a film shape on a casting roll 6a as a supporting body, so that the extruded resin is sequentially cooled on a first cooling roll 6b and a second cooling roll 6c, whereby the optical film 100 can be obtained. An unshown electrostatic pinning apparatus is provided to the vicinity of the opening of the die 5 so that static electricity can be applied to both ends of the optical film 100. With this electrostatic pinning apparatus, both ends of the optical film 100 are electrostatically chucked to the casting roll 6a.

The take-over speed of the casting roll 6a, the first cooling roll 6b, and the second cooling roll 6c is adequately set in conformity with the degree of thermal shrinkage of the optical film 100 in order to obtain a uniform film thickness.

The optical film 100 cooled on the casting roll 6a, the first cooling roll 6b, and the second cooling roll 6c is delivered to a winding roll 8 via a conveyance roll 7, and then is wound around the winding roll 8 and collected. In this manner, the long-length optical film 100 is produced.

Figure 5:
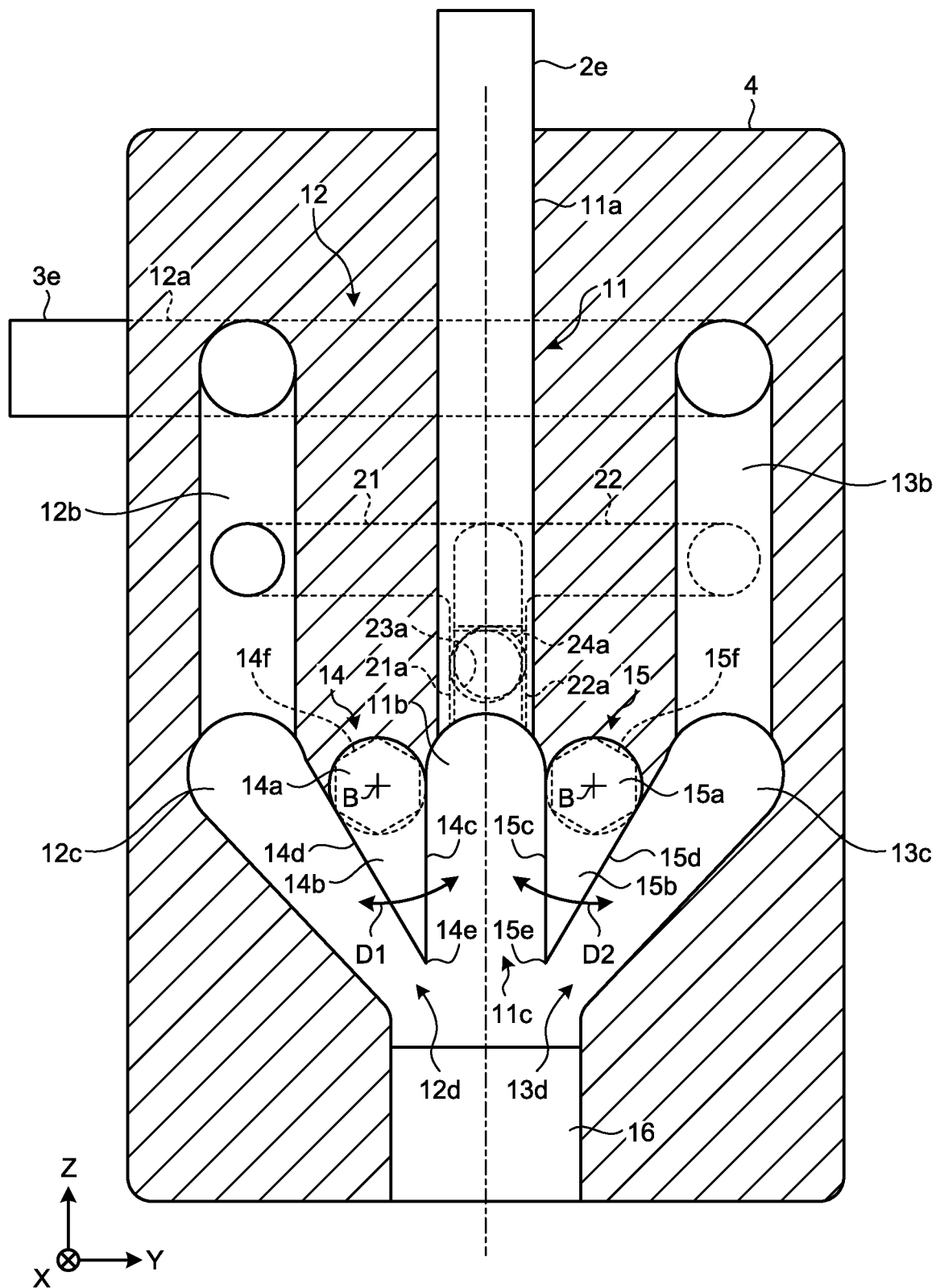
FIG. 5 is a vertical cross-sectional view seen from the side thereof, schematically illustrating a feed block according to an embodiment of the present invention.
Figure 6:
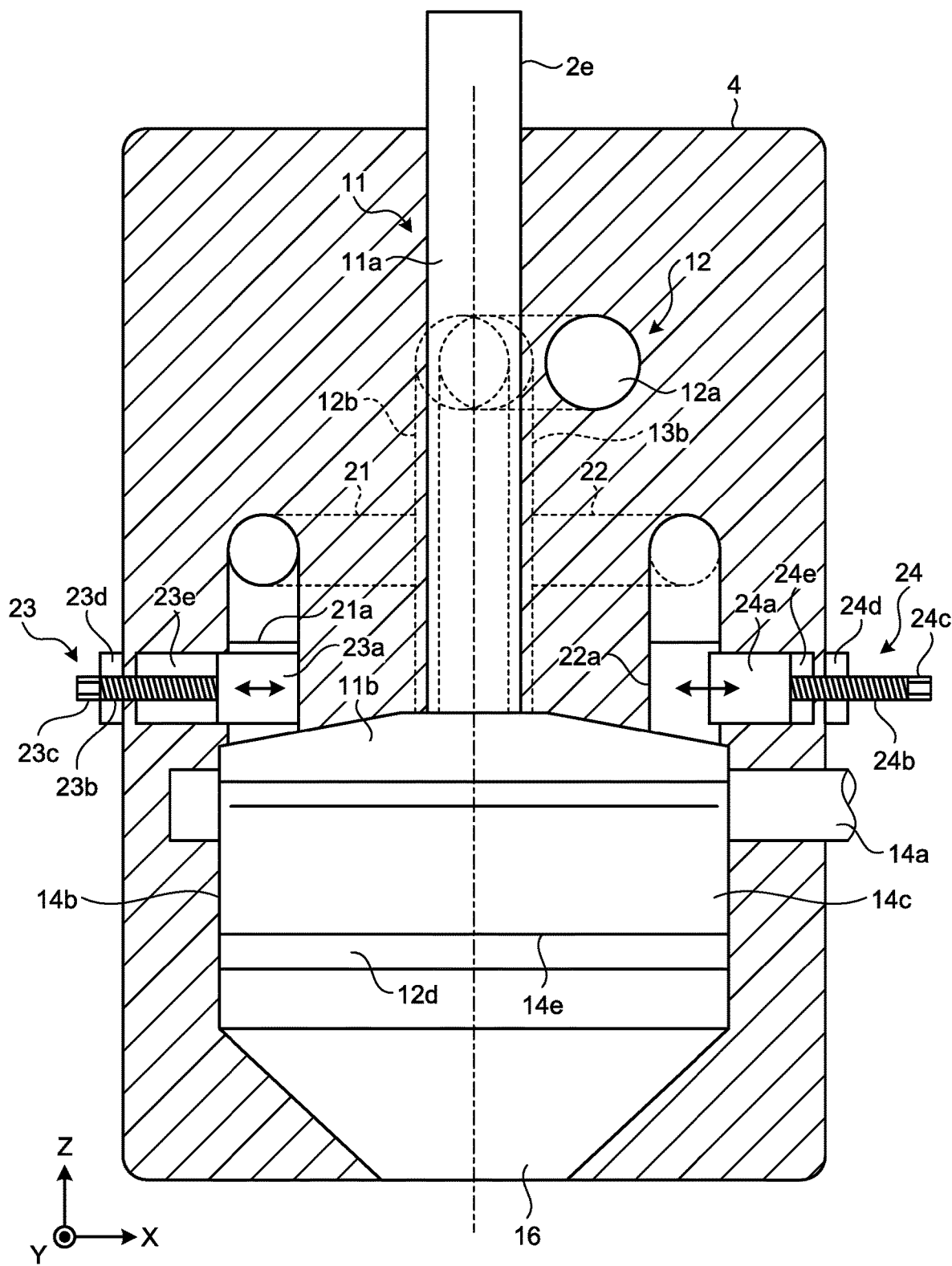
FIG. 6 is a vertical cross-sectional view seen from the front thereof, schematically illustrating the feed block according to the embodiment of the present invention.
Figure 7:
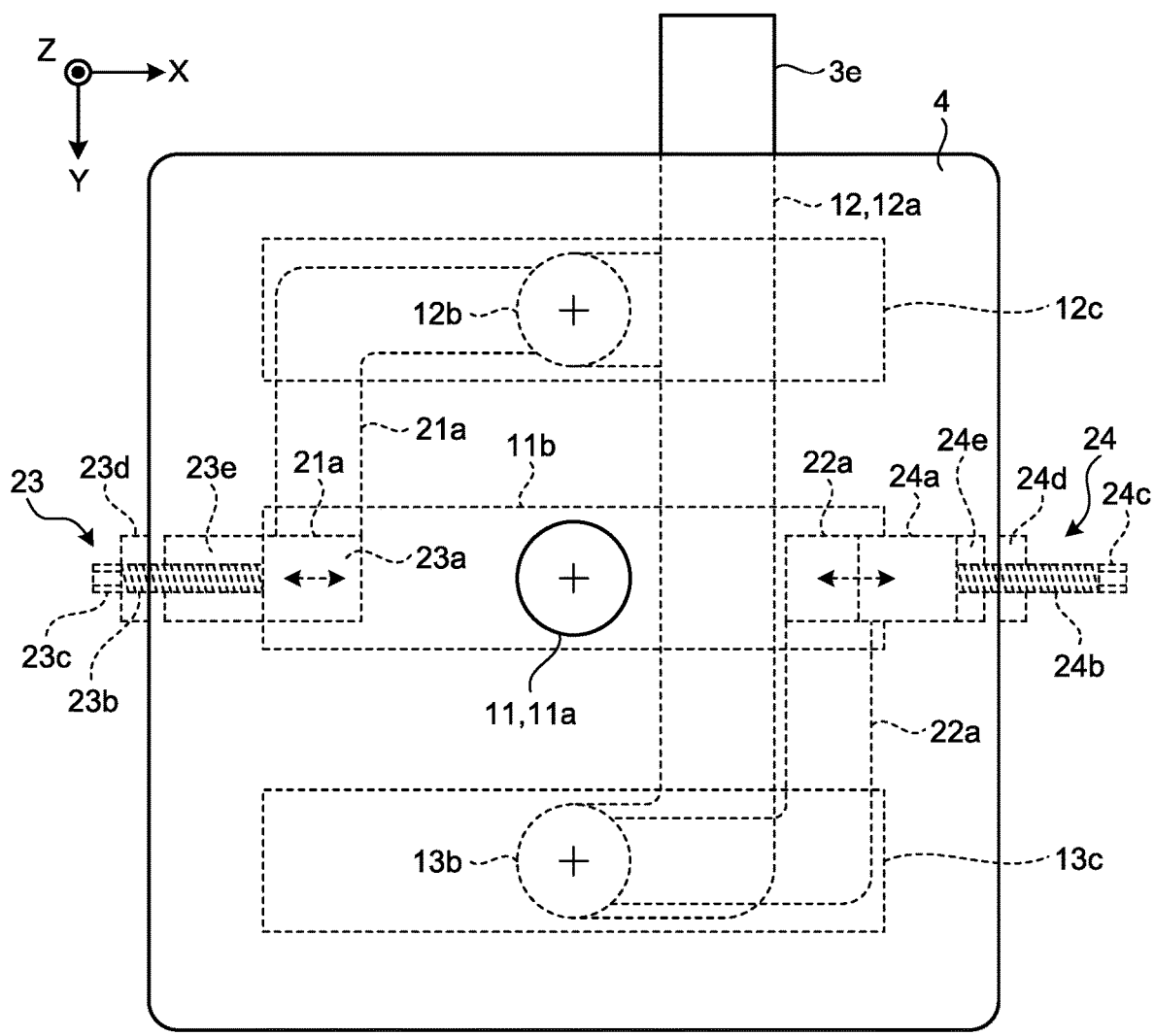
FIG. 7 is a plan view schematically illustrating the feed block according to the embodiment of the present invention.
Figure 8:
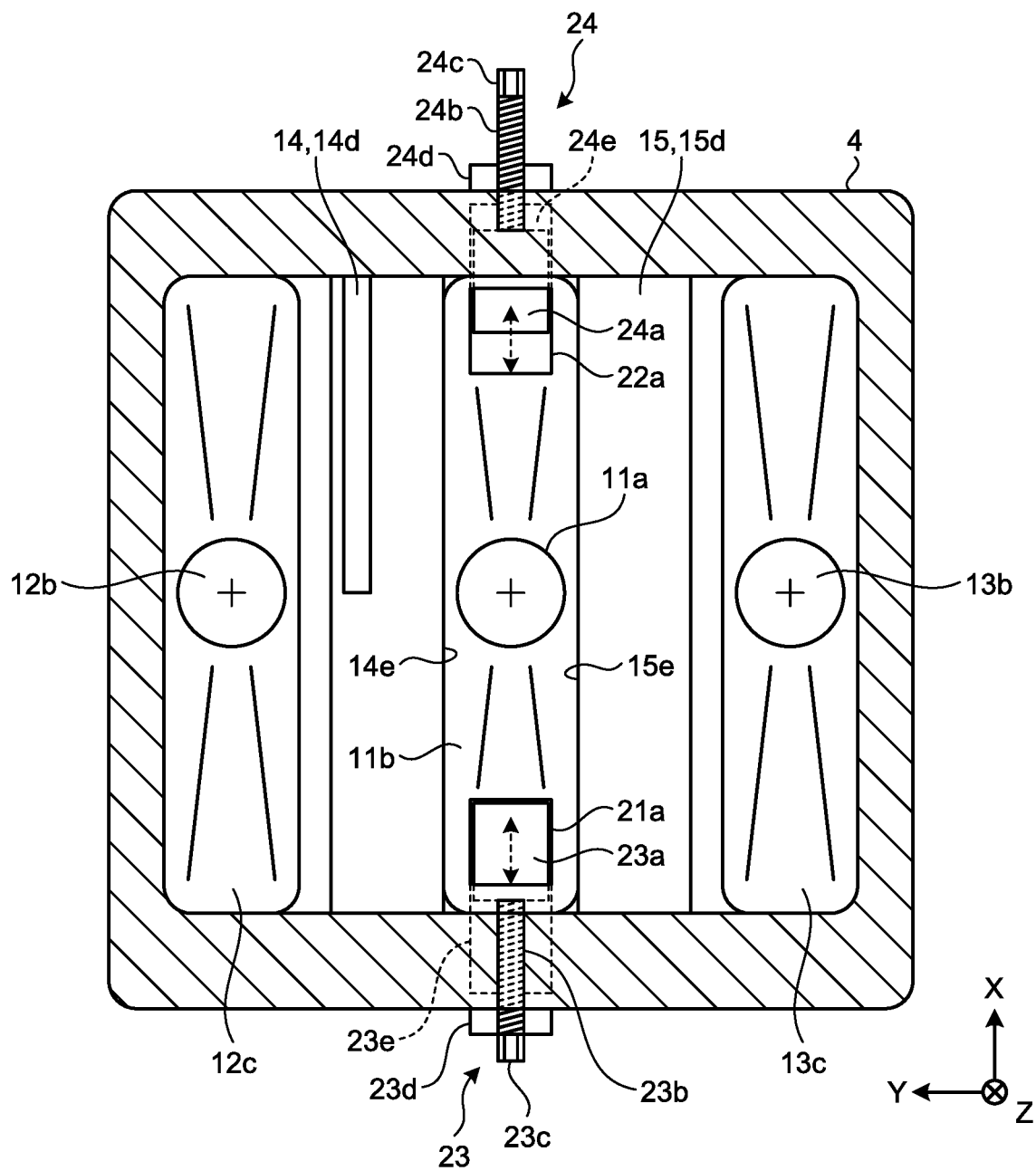
FIG. 8 is a transverse cross-sectional view seen from the bottom thereof, schematically illustrating the feed block according to the embodiment of the present invention.

Subsequently, the feed block 4 will be described in detail. FIG. 5 to FIG. 8 are diagrams schematically illustrating the feed block 4 according to an embodiment of the present invention. FIG. 5 is a vertical cross-sectional view seen from the side thereof, FIG. 6 is a vertical cross-sectional view seen from the front thereof, FIG. 7 is a plan view, and FIG. 8 is a transverse cross-sectional view seen from the bottom thereof.

As illustrated in FIG. 5 to FIG. 8, the feed block 4 includes a first resin flow channel 11 and a second resin flow channel 12 inside the block. The first resin flow channel 11 has a pipe channel (first pipe channel) 11a and a widened portion 11b. One end of the pipe channel 11a opens from the upper surface of the block toward the outside. The pipe 2e of the first melted resin supply system 2 is connected to the opening via an unshown flange so that the thermoplastic resin A (first melted resin) in a melted state can be supplied from the first melted resin supply system 2 through the opening. The other end of the pipe channel 11a is connected to the approximately rectangular widened portion 11b having its lengthwise direction in the X direction (first direction) so that the other end opens on the approximately central portion of the widened portion 11b. An outlet (a first outlet) 11c on the downstream side of the widened portion 11b is shaped in an approximately rectangle similarly having its lengthwise direction in the X direction.

The second resin flow channel 12 includes a pipe channel (second pipe channel) 12a, a branch pipe channel (second pipe channel) 12b, and a widened portion 12c, as well as a branch pipe channel (third pipe channel) 13b and a widened portion 13c. One end of the pipe channel 12a opens from the side surface of the block toward the outside. The pipe 3e of the second melted resin supply system 3 is connected to the opening via an unshown flange so that the thermoplastic resin B (second melted resin) in a melted state can be supplied from the second melted resin supply system 3 through the opening. One end of the branch pipe channel 12b and one end of the branch pipe channel 13b are connected to the pipe channel 12a. The other end of the branch pipe channel 12b is connected to the approximately rectangular widened portion 12c having its lengthwise direction in the X direction so that the other end opens on the approximately central portion of the widened portion 12c. An outlet (a second outlet) 12d on the downstream side of the widened portion 12c is shaped in an approximately rectangle similarly having its lengthwise direction in the X direction. The other end of the branch pipe channel 13*b* is connected to the approximately rectangular widened portion 13*c* having its lengthwise direction in the X direction so that the other end opens on the approximately central portion of the widened portion 13*c*. An outlet (a third outlet) 13*d* on the downstream side of the widened portion 13*c* is shaped in an approximately rectangle similarly having its lengthwise direction in the X direction.

The outlet (second outlet) 12*d* of the widened portion 12*c* is disposed so as to be adjacent to one side in the lateral direction (Y direction) of the outlet (first outlet) 11*c*. The outlet (third outlet) 13*d* of the widened portion 13*c* is disposed so as to be adjacent to the other side in the lateral direction (Y direction) of the first outlet 11*c* (see FIG. 5).

As illustrated in FIG. 6, one end of a sub-pipe channel (fourth pipe channel) 21 is connected to the branch pipe channel 12*b*. The other end of the sub-pipe channel 21 becomes a rectangular portion 21*a* having an approximately rectangular (in the present embodiment, approximately square) cross section, through a change portion where the cross section gradually changes from an approximately circular shape to an approximately rectangular shape (square shape). This rectangular portion 21*a* is connected to the vicinity of one end of the widened portion 11*b* so as to open there. This sub-pipe channel 21 is a pipe channel which is capable of supplying the thermoplastic resin B (second melted resin) for forming the low concentration portion 120 in the region 113 on one side of the high concentration portion 110 in the width direction of the optical film 100.

One end of a sub-pipe channel (fifth pipe channel) 22 is connected to the branch pipe channel 13*b*. The other end of the sub-pipe channel 22 becomes a rectangular portion 22*a* having an approximately rectangular (in the present embodiment, approximately square) cross section, through a change portion where the cross section gradually changes from an approximately circular shape to an approximately rectangular shape (approximately square shape). This rectangular portion 22*a* is connected to the vicinity of the other end portion of the widened portion 11*b* so as to open there. This sub-pipe channel 22 is a pipe channel which is capable of supplying the thermoplastic resin B (second melted resin) for forming the low concentration portion 120 in the region 114 on the other side of the high concentration portion 110 in the width direction of the optical film 100.

A deckle mechanism (first flow rate adjuster) 23 is provided to the vicinity of the rectangular portion 21*a* of the sub-pipe channel 21. The deckle mechanism 23 is a flow rate adjuster capable of adjusting the flow rate of the thermoplastic resin B to be supplied to the vicinity of one end portion of the widened portion 11*b*. The deckle mechanism 23 includes a deckle (first deckle) 23*a* which is inserted in a back and forth-movable manner into the rectangular portion 21*a*, a male screw portion 23*b*, and a female screw portion 23*d*. The deckle 23*a* is a member formed in an approximately cylindrical shape, and the male screw portion 23*b* is integrally formed on the member in an approximately coaxial position. The diameter of the deckle 23*a* is set to be slightly smaller than the length of one side of the rectangular portion 21*a*. The size in the axial direction (X direction) of the deckle 23*a* is set to be a value larger than the length of one side of the rectangular portion 21*a*. A nut portion 23*c* is integrally formed on the distal end portion of the male screw portion 23*b*.

The feed block 4 includes a cavity portion 23*e* so that one end of the cavity portion 23*e* reaches the rectangular portion 21*a*, and the other end thereof does not reach the side surface of the block. The cavity portion 23*e* has a tubular shape with a diameter that is slightly larger than the diameter of the deckle 23*a*, and the deckle 23*a* is slidably inserted into the cavity portion 23*e*. A through hole is formed with the cavity portion 23*e* so as to open on the side surface of the block. This through hole is formed approximately coaxially with the cavity portion 23*e*. The female screw portion 23*d* is disposed coaxially with this through hole, and fixed to the side surface of the block. The deckle 23*a* is housed in the cavity portion 23*e* in a state in which the male screw portion 23*b* is screwed into the female screw portion 23*d*.

The deckle 23*a* is capable of being slid and moved in a direction in which the deckle 23*a* is inserted into the rectangular portion 21*a*, by rotating the nut portion 23*c* in the screwing direction. The deckle 23*a* is capable of being slid and moved in a direction in which the deckle 23*a* is pulled out of the rectangular portion 21*a*, by rotating the nut portion 23*c* in the anti-screwing direction. Furthermore, the deckle 23*a* is provided such that it is capable of being fixed at any position between full closure and full open. By having such a configuration, the supply amount of the thermoplastic resin B from the sub-pipe channel 21 to the vicinity of one end portion of the widened portion 11*b* can be freely adjusted.

A deckle mechanism (second flow rate adjuster) 24 is provided to the vicinity of the rectangular portion 22*a* of the sub-pipe channel 22. The deckle mechanism 24 is a flow rate adjuster capable of adjusting the flow rate of the thermoplastic resin B to be supplied to the vicinity of the other end portion of the widened portion 11*b*. The deckle mechanism 24 includes a deckle (second deckle) 24*a* which is inserted in a back and forth-movable manner into the rectangular portion 22*a*, a male screw portion 24*b*, and a female screw portion 24*d*. The deckle 24*a* is a member formed in an approximately cylindrical shape, and the male screw portion 24*b* is integrally formed on the member in an approximately coaxial position. The diameter of the deckle 24*a* is set to be slightly smaller than the length of one side of the rectangular portion 22*a*. The size in the axial direction (X direction) of the deckle 24*a* is set to be a value larger than the length of one side of the rectangular portion 22*a*. A nut portion 24*c* is integrally formed on the distal end portion of the male screw portion 24*b*.

In the feed block 4, a cavity portion 24*e* is formed so that one end of the cavity portion 24*e* reaches the rectangular portion 22*a*, and the other end thereof does not reach the side surface of the block. The cavity portion 24*e* has a tubular shape with a diameter that is slightly larger than the diameter of the deckle 24*a*, and the deckle 24*a* is slidably inserted into the cavity portion 24*e*. A through hole is formed with the cavity portion 24*e* so as to open on the side surface of the block. This through hole is formed approximately coaxially with the cavity portion 24*e*. The female screw portion 24*d* is disposed coaxially with this through hole, and fixed to the side surface of the block. The deckle 24*a* is housed in the cavity portion 24*e* in a state in which the male screw portion 24*b* is screwed into the female screw portion 24*d*.

The deckle 24*a* is capable of being slid and moved in a direction in which the deckle 24*a* is inserted into the rectangular portion 22*a*, by rotating the nut portion 24*c* in the screwing direction. The deckle 24*a* is capable of being slid and moved in a direction in which the deckle 24*a* is pulled out of the rectangular portion 22*a*, by rotating the nut portion 24*c* in the anti-screwing direction. Furthermore, the deckle 24*a* is provided such that it is capable of being fixed at any position between full closure and full open. By having such a configuration, the supply amount of the thermoplastic resin B from the sub-pipe channel 22 to the vicinity of the other end portion of the widened portion 11b can be freely adjusted.

As illustrated in FIG. 5, a vane (vane member) 14 is disposed in a portion between the widened portion 11b and the widened portion 12c (a portion in the vicinity on the upstream side of a confluence between the first resin flow channel 11 and the second resin flow channel 12). The vane 14 includes a shaft portion 14a which is pivotally and rotatably supported about an axis (central axis) B approximately parallel to the X direction, and a V-shaped portion 14b which is integrally formed to the shaft portion 14a so as to project. At one end of the shaft portion 14a, a hexagonal portion 14f for rotating the vane 14 about the central axis B is integrally formed in an approximately coaxial position, for adjusting the posture of this vane 14. The V-shaped portion 14b includes a first side surface 14c and a second side surface 14d which form an approximately V shape.

The first side surface 14c is disposed to constitute a part of the side wall of the widened portion 11b (part of the vicinity of the first outlet 11c), and the second side surface 14d is disposed to constitute a part of the side wall of the widened portion 12c (part of the vicinity of the second outlet 12d). A ridge portion 14e where the first side surface 14c and the second side surface 14d intersect has a liner shape extending along a line approximately parallel to the X direction. The shape of the ridge portion 14e may be a curve (such as an arc) which constitutes a concave or convex with respect to the line approximately parallel to the X direction, or a polyline (such as a V shape).

A vane (vane member) 15 is disposed in a portion between the widened portion 11b and the widened portion 13c (a portion in the vicinity on the upstream side of a confluence between the first resin flow channel 11 and the second resin flow channel 12). The vane 15 has an approximately symmetrical shape to the vane 14, and the vane 15 includes a shaft portion 15a which is pivotally and rotatably supported about an axis (central axis) B approximately parallel to the X direction, and a V-shaped portion 15b which is integrally formed at the shaft portion 15a so as to project. At one end of the shaft portion 15a, a hexagonal portion 15f for rotating the vane 15 about the central axis B is integrally formed in an approximately coaxial position, for adjusting the posture of this vane 15. The V-shaped portion 15b includes a first side surface 15c and a second side surface 15d which form an approximately V shape.

The first side surface 15c is disposed to constitute a part of the side wall of the widened portion 11b (part of the vicinity of the first outlet 11c), and the second side surface 15d is disposed to constitute a part of the side wall of the widened portion 13c (part of the vicinity of the third outlet 13d). A ridge portion 15e where the first side surface 15c and the second side surface 15d intersect has a liner shape extending along a line approximately parallel to the X direction. The shape of the ridge portion 15e may be a curve (such as an arc) which forms a concave or convex with respect to the line approximately parallel to the X direction, or a polyline (such as a V shape).

The vanes 14 and 15 are, as illustrated in FIG. 5, rotatably supported within prescribed angle ranges as indicated by arc-shaped arrows D1 and D2 in FIG. 5 about their respective central axes B. The vanes 14 and 15 is capable of being positioned and fixed at any positions within the above-mentioned prescribed angle ranges. Thus, symmetrical or asymmetrical rotation of the vanes 14 and 15 is capable of changing the positions of the ridge portions 14e and 15e, thereby modifying the shapes of the outlet (first outlet) 11c, the outlet (second outlet) 12d, and the outlet (third outlet) 13d.

The vane 14 and the vane 15 used in the present embodiment each have V shapes (the ridge portions 14e and 15e) symmetric to each other. Accordingly, it is possible to produce the optical film 100 including the low concentration portion 120 with the same material and thickness in the regions 111 and 112 on both sides in the thickness direction of the high concentration portion 110. However, the V shapes of the vane 14 and the vane 15 may not be correlated with each other, depending on the profile of the optical film 100 to be produced.

The confluence where the outlet (first outlet) 11c of the first resin flow channel 11 (the widened portion 11b), the outlet (second outlet) 12d of the second resin flow channel 12 (the widened portion 12c), and the outlet (third outlet) 13d of the second resin flow channel 12 (the widened portion 13c) are disposed has an approximately rectangular shape as a whole. One end of a delivery pipe channel 16 having an approximately rectangular cross section is connected to the downstream side of this confluence. The other end of the delivery pipe channel 16 opens on the bottom surface of the block. This opening is connected to an unshown resin receiving inlet of the die 5. In the present embodiment, an example in which the resin receiving inlet of the die 5 has an approximately circular shape is indicated. The shape of the delivery pipe channel 16 gradually changes from rectangular to circular on the downstream side of the approximately rectangular confluence. Accordingly, the opening of the delivery pipe channel 16 has an approximately circular shape. It is noted that the shape of the delivery pipe channel 16 depends on the shape of the resin receiving inlet of the die 5. For example, when the resin receiving inlet of the die 5 is rectangular, the delivery pipe channel 16 may have a shape the cross section of which is rectangular throughout.

When the optical film 100 is produced using the production apparatus 1 according to the present embodiment, the melted thermoplastic resin A containing the additive is supplied to the first resin flow channel 11 of the feed block 4 through the first melted resin supply system 2, and the melted thermoplastic resin B containing the additive at a concentration lower than the thermoplastic resin A is supplied to the second resin flow channel 12 of the feed block 4 by the second melted resin supply system 3, as illustrated in FIG. 4.

As illustrated in FIG. 5 to FIG. 8, the thermoplastic resin A is supplied to the central portion of the widened portion 11b through the pipe channel 11a. The thermoplastic resin B is supplied to the vicinity of one end portion of the widened portion 11b through the pipe channels 12a, 12b, and 21, and further supplied to the vicinity of the other end portion of the widened portion 11b through the pipe channels 12a, 13b, and 22. As a result, the thermoplastic resin A and the thermoplastic resin B reach the outlet 11c of the widened portion 11b in a state in which the thermoplastic resin B is disposed on both sides of the thermoplastic resin A disposed in the middle portion. At this time, the supply amount of the thermoplastic resin B to the vicinity of one end portion of the widened portion 11b is determined according to the position of the deckle 23a of the deckle mechanism 23. The supply amount of the thermoplastic resin B to the vicinity of the other end portion of the widened portion 11b is determined according to the position of the deckle 24a of the deckle mechanism 24. Therefore, the supply amount of the thermoplastic resin B for forming the low concentration portion 120 in the regions 113 and 114 on both sides of the high concentration portion 110 in the width direction of the optical film 100 can be adjusted through adjustment of the positions of the deckles 23a and 24a (consequently, the amount of projection of the deckles 23a and 24a into the rectangular portions 21a and 22a).

Furthermore, the thermoplastic resin B reaches the outlet 12d through the pipe channels 12a and 12b as well as the widened portion 12c, and reaches the outlet 13d through the pipe channels 12a and 13b as well as the widened portion 13c. At this time, the relative width of the outlet 12d of the widened portion 12c with respect to the width of the outlet 11c of the widened portion 11b is determined according to the angle of the vane 14. The relative width of the outlet 13d of the widened portion 13c with respect to the width of the outlet 11c of the widened portion 11b is determined according to the angle of the vane 15. Therefore, the supply amount of the thermoplastic resin B for forming the low concentration portion 120 in the regions 113 and 114 on both sides of the high concentration portion 110 in the thickness direction of the optical film 100 can be adjusted through adjustment of the angles of the vanes 14 and 15 (consequently, the rotation amounts of the vanes 14 and 15).

The thermoplastic resin A and the thermoplastic resin B join together to be stacked on each other at a confluence constituted by these outlets 11c, 12d, and 13d, and the thermoplastic resin A and the thermoplastic resin B are supplied to the die 5 disposed downstream of the feed block 4 through the delivery pipe channel 16. At this time, since the flow channels within the feed block 4 are formed as described above, the thermoplastic resin A flowing through the delivery pipe channel 16 forms a layer of the thermoplastic resin A flowing in the center of the delivery pipe channel 16. The thermoplastic resin B flowing through the delivery pipe channel 16 forms a layer of the thermoplastic resin B flowing so as to surround the layer of the thermoplastic resin A.

Therefore, the die 5 is filled with the layer of the thermoplastic resin A in a melted state, and the layer of the thermoplastic resin B in a melted state disposed on both sides in the thickness direction and on both sides in the width direction of the layer of the thermoplastic resin A. Then, the thermoplastic resin A and the thermoplastic resin B are extruded from this die 5 into a film shape.

The thermoplastic resin A and the thermoplastic resin B extruded from the die 5 into a film shape are sequentially cooled around the casting roll 6a, the first cooling roll 6b, and the second cooling roll 6c thereby to be cured to form the optical film 100. The resulting optical film 100 are wound around the winding roll 8 via the conveyance roll 7, and collected.

According to the production method of the above-mentioned embodiment, the supply amount of the thermoplastic resin B to be supplied to the vicinity of one end portion of the widened portion 11b and the supply amount of the thermoplastic resin B to be supplied to the vicinity of the other end portion of the widened portion 11b can be independently adjusted through the adjustment of the positions of the deckles 23a and 24a of the deckle mechanisms 23 and 24. As a result, the width of the low concentration portion 120 in the region 113 on one side of the high concentration portion 110 in the width direction of the optical film 100, and the width of the low concentration portion 120 in the region 114 on the other side thereof can be freely adjusted. Even when there is a pressure difference between the resin supply system to the vicinity of one end portion of the widened portion 11b and the resin supply system to the vicinity of the other end portion of the widened portion 11b, the deckle mechanisms 23 and 24 may be adjusted responding to their pressure difference, whereby the low concentration portion 120 can have approximately the same width in the regions 113 and 114 on both sides of the high concentration portion 110 in the width direction of the optical film 100. Furthermore, since the pressure difference between the resin supply system to the vicinity of one end portion of the widened portion 11b and the resin supply system to the vicinity of the other end portion of the widened portion 11b becomes acceptable, design restrictions such as pipe channel routing of the resin supply systems can be reduced.

According to the production method of the above-mentioned embodiment, the relative width of the outlet 12d of the widened portion 12c with respect to the width of the outlet 11c of the widened portion 11b, and the relative width of the outlet 13d of the widened portion 13c with respect to the width of the outlet 11c of the widened portion 11b can be adjusted through the adjustment of the angles of the vanes 14 and 15. As a result, the thickness of the low concentration portion 120 in the region 111 on one side of the high concentration portion 110 in the thickness direction of the optical film 100, and the thickness of the low concentration portion 120 in the region 112 on the other side thereof can be freely adjusted.

Furthermore, according to the production method of the above-mentioned embodiment, the thickness profile of the high concentration portion 110 of the optical film 100 can be freely adjusted by adjusting the positions of the deckles 23a and 24a of the deckle mechanisms 23 and 24 as well as the angles of the vanes 14 and 15 in combination. As a result, the high concentration portion 110 can have a uniform thickness.

[3. Trimmed Film]

The above-mentioned optical film is usually used after cutting off the end portions in the width direction of the optical film from the optical film. A film obtained by cutting off the end portions in the width direction of the optical film from the optical film in this manner is a trimmed film. This trimmed film usually has a structure and physical properties that are the same as those of the optical film, except that it does not have the end portions which have been cut off.

Figure 9:
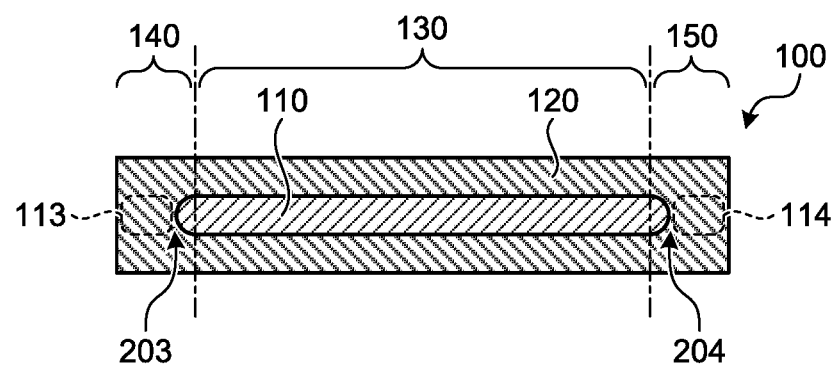
FIG. 9 is a cross-sectional view schematically illustrating an example of the optical film of the present invention, for indicating end portions to be cut off from the optical film.
Figure 10:
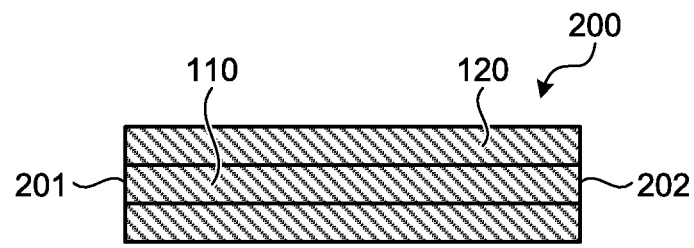
FIG. 10 is a cross-sectional view schematically illustrating an example of the trimmed film of the present invention.

FIG. 9 is a cross-sectional view schematically illustrating an example of the optical film of the present invention, for indicating end portions to be cut off from the optical film. In FIG. 9, the cutting positions are indicated by dot-and-dash lines. FIG. 10 is a cross-sectional view schematically illustrating an example of the trimmed film of the present invention.

As illustrated in FIG. 9 and FIG. 10, when a trimmed film 200 is produced from the optical film 100, end portions 140 and 150 on both sides in the width direction of the optical film 100 are cut off. The cutting positions at this time may be optionally set depending on the shape of the trimmed film 200 to be produced.

The cutting positions are usually set such that the end portions 140 and 150 which include the low concentration portion 120 in the regions 113 and 114 on both sides of the high concentration portion 110 in the width direction of the optical film 100 can be cut off. In this case, the obtained trimmed film 200 includes the high concentration portion 110 exposed on end surfaces 201 and 202 at the ends in the width direction of the trimmed film 200. However, the additive contained in the high concentration portion 110 is not easily volatilized unless the temperature is as high as that during melt extrusion. As a result, according to the trimmed film 200 obtained from the optical film 100, contamination of production facilities can be suppressed.

The cutting positions are preferably set such that boundary portions 203 and 204 between the low concentration portion 120 in the regions 113 and 114 on both sides of the high concentration portion 110 in the width direction of the optical film 100 and the high concentration portion 110 can be cut off from the optical film 100 produced using the above-mentioned feed block. The retention of the thermoplastic resin B in the feed block 4 caused by the deckles 23a and 24a can cause the boundary portions 203 and 204 to be contaminated with foreign matter. For this reason, the boundary portions 203 and 204 may be cut off to eliminate foreign matter, so that the trimmed film 200 having high quality can be obtained.

In particular, when the optical film 100 includes the uniform thickness region 130 where the high concentration portion 110 has a thickness of "average thickness of the high concentration portion 110 ±5 μm", the cutting positions are preferably set such that only this uniform thickness region 130 remains in the trimmed film 200. Accordingly, the trimmed film 200 which includes the high concentration portion 110 having small fluctuations in thickness throughout the film can be obtained. Since such a trimmed film 200 includes the high concentration portion 110 having small fluctuations in thickness, the content of the additive can be made approximately constant along the width direction. Here, "the content of the additive being approximately constant along the width direction" refers fluctuations in concentration of the additive being confined within the range of 10% or less of the average concentration of the additive entirely along the width direction. The fluctuations in concentration of the additive may be measured by gas chromatography.

[4. Stretched Film]

The optical film according to the present invention may be used as a primary film for tenter stretching. Herein, the primary film is a film to be subjected to a tenter stretching process. The optical film according to the present invention may be subjected to the tenter stretching process to obtain a stretched film, whereby a stretched film having desired optical characteristics such as retardation can be produced. In the optical film according to the present invention, the high concentration portion usually has small fluctuations in thickness, and the content of the additive is approximately constant along the width direction. Therefore, when the optical film according to the present invention is used as the primary film, the fluctuations in thickness and retardation of the thus obtained stretched film can be reduced.

The stretched film is usually a film which includes the low concentration portion, the high concentration portion, and the low concentration portion in this order in the thickness direction of the stretched film. Therefore, when the stretched film is produced from the optical film containing the thermoplastic resin A and the thermoplastic resin B, the produced stretched film usually includes a layer of the thermoplastic resin B, a layer of the thermoplastic resin A and a layer of the thermoplastic resin B in this order in its thickness direction.

Examples of the method for producing such a stretched film may include a first production method including: a step of supplying an optical film to a tenter stretching machine having grippers; a step of stretching the optical film while holding both end portions in the width direction of the optical film with the grippers of the tenter stretching machine to obtain a stretched film; and a step of cutting off both the end portions from the obtained stretched film.

Stretching conditions may be optionally set in accordance with desired optical characteristics to be expressed in the stretched film. The stretching temperature is specifically in the range of preferably (Tg−30° C.) or higher, and more preferably (Tg−10° C.) or higher, and is preferably (Tg+60° C.) or lower, and more preferably (Tg+50° C.) or lower. Herein, Tg indicates the glass transition temperature of the thermoplastic resin A which forms the high concentration portion. The stretching ratio is preferably 1.05 times or more, and more preferably 1.1 times or more, and is preferably 5.0 times or less, and more preferably 2.0 times or less.

In some cases, desired optical characteristics may not be expressed in both end portions in the width direction of the obtained stretched film. The reason may be as follows. Since both end portions in the width direction of the stretched film are held by the grippers, molecules in the film may not be adequately oriented even by stretching. To address this concern, it is preferable to cut off both end portions in the width direction of the stretched film from the stretched film. The end portions to be cut off usually contain the low concentration portion in the regions on both sides of the high concentration portion in the width direction of the stretched film. Accordingly, a stretched film having desired optical characteristics over the entire film can be obtained.

In particular, in the stretched film produced from the optical film including the high concentration portion having the uniform thickness region having a thickness of "average thickness of the high concentration portion ±5 μm", the cutting positions are preferably set such that only the region of the stretched film corresponding to this uniform thickness region remains. Accordingly, a stretched film which includes the high concentration portion 110 having small fluctuations in thickness throughout the film can be obtained. Since such a stretched film includes the high concentration portion having small fluctuations in thickness, the content of the additive can be made approximately constant along the width direction.

The examples of the method for producing the stretched film may further include a second production method having: a step of cutting off both end portions in the width direction of an optical film to obtain a trimmed film; and a step of supplying the obtained trimmed film to a tenter stretching machine for stretching to obtain a stretched film. Stretching conditions in the second production method may be the same as those in the first production method.

The stretched film having desired optical characteristics can also be obtained in such a second production method, similarly to in the first production method. Advantages similar to those in the first production method can also be obtained in the second production method.

Usually, retardation is expressed in the above-mentioned stretched film. The degree of retardation of the stretched film can be optionally set in accordance with the use of the stretched film. For example, an in-plane retardation Re of the stretched film can be preferably 50 nm or more, and preferably 200 nm or less. A retardation Rth in the thickness direction of the stretched film can be preferably 50 nm or more, and preferably 300 nm or less.

The use of the stretched film obtained in this manner is not limited, and the stretched film may be used, for example, as a phase difference film and a polarizing plate protective film.

EXAMPLES

Hereinafter, the present invention will be specifically described by referring to Examples. However, the present invention is not limited to the following Examples. The present invention may be freely modified and practiced without departing from the scope of claims of the present invention and equivalents thereto.

Unless otherwise stated, "%" and "part" that represent an amount of a material in the following description are based on weight. Further, unless otherwise stated, the operations described below were performed under the conditions of normal temperature and normal pressure.

(Method for Measuring Widths of High Concentration Portion and Low Concentration Portion)

The transmittance of the obtained optical film was measured at intervals of 10 mm in the width direction using a spectrophotometer. The measurement results at the measurement points were compared with each other, for measuring the width of the high concentration portion of the optical film, and the widths (side widths; width $W_R$ and $W_L$ in FIG. 3) of the low concentration portion formed in the regions (that is, the left-side region 113 and the right-side region 114 indicated in FIG. 1) on both sides of the high concentration portion in the width direction of the optical film.

(Method for Measuring Thickness of High Concentration Portion)

A measurement region (corresponding to the uniform thickness region 130 indicated in FIG. 9) was set in a 500 mm section which is continuous in the width direction of the optical film centered at the central portion in the width direction of the optical film. The transmittance at a wavelength of 380 nm measured in this measurement region, and the absorption coefficients of the polymer and the additive which constitute the film were used to measure the thickness (thickness $T_C$ in FIG. 3) of the high concentration portion in accordance with the Beer-Lambert law. On the basis of the measured thickness of the high concentration portion, the average thickness, maximum thickness, minimum thickness, and thickness fluctuations of the high concentration portion of the optical film in the measurement region were obtained.

(Method for Measuring Thickness of Low Concentration Portion)

A measurement region (corresponding to the uniform thickness region 130 indicated in FIG. 9) was set in a 500 mm section which is continuous in the width direction of the optical film centered at the central portion in the width direction of the optical film. A plurality of measurement points were set at intervals of 100 mm in the width direction in this measurement region. At each measurement point, the total thickness of the optical film was measured using a commercially available contact thickness meter. Thereafter, the optical film was cut so that a cross section parallel to the width direction and the thickness direction was obtained, and the cross section was observed using an optical microscope. At each of the above-mentioned measurement points, the ratio between the thickness of the high concentration portion and the thickness of each low concentration portion was measured. Thereafter, at each of the above-mentioned measurement points, the thickness of each low concentration portion at each of the measurement points was calculated from the values of the ratio between the thickness of the high concentration portion and the thickness of each low concentration portion and the total thickness of the optical film. The average value of the thickness of each low concentration portion at each of the measurement points obtained in this manner was calculated. This average value was defined as the average thickness (thicknesses $T_U$ and $T_D$ in FIG. 3) of each low concentration portion of the optical film.

(Method for Evaluating Line Contamination)

The casting roll provided to the production apparatus was observed. When adhesion of the ultraviolet absorber on the surface of the casting roll was absent, a judgment of "good" was made, and when the adhesion of the ultraviolet absorber on the surface of the casting roll was present, a judgment of "poor" was made.

(Method for Evaluating Die Line)

The produced optical film was irradiated with light, and the transmitted light was projected on a screen. When a die line has been formed on the optical film, the die line generally appears as a light or dark streak in the projected image. Then, a portion of the optical film corresponding to the light or dark streak of light which appears on the screen was cut out into a 30 mm square (this portion is a portion where the depth of a concave or the height of a convex is large). The surface of the cut-out film piece was observed using a three-dimensional surface structure analysis microscope (visual field area: 5 mm×7 mm), and this was converted into a three-dimensional image. From this three-dimensional image, a cross-sectional profile of the optical film taken along a plane vertical to the lengthwise direction of the optical film was obtained. The cross-sectional profile was obtained at intervals of 1 mm in the visual field area. The average line was drawn on this cross-sectional profile. The length from this average line to the bottom of a concave is taken as a concave depth, and the length from this average line to the top of a convex is taken as a convex height. The distance between intersections of the average line and the profile is taken as the width of a concave or a convex. From these concave depths, the maximum value was obtained, and from these convex heights, the maximum value was obtained. Then, the width of the concave exhibiting the maximum value and the width of the convex exhibiting the maximum value were obtained. The maximum value of the concave depth and the maximum value of the convex height, as well as the widths of the concave and convex each exhibiting the maximum value, which were obtained as described above, were defined as the depth of a linear concave, the height of a linear convex, and the widths thereof for the film.

When a die line including a concave having a depth of 30 nm or more and a width of 700 nm or less or a convex having a height of 30 nm or more and having a width of 700 nm or less was not formed on the optical film, a judgment of "good" was made, and when the above-mentioned die line was formed on the optical film, a judgment of "poor" was made.

(Method for Evaluating Dents)

The produced optical film was visually observed, and the number of dents was counted. Herein, dents refer to dot-like concaves or convexes formed on the surface of the optical film. These dents were formed in the following manner: the volatilized additive adhered to the film conveyance roll, the adhering additive was solidified to form a lump, and the shape of the lump was transferred onto the optical film. When the number of dents each including a concave having a depth of 500 nm or more or a convex having a height of 500 nm or more was 0 to 10 per 300 mm in length of the optical film, a judgment of "good" was made, and when it is 11 or more, a judgment of "poor" was made.

Example 1

(Preparation of Thermoplastic Resin)

As a thermoplastic resin, a cycloolefin resin containing a cyclic olefin polymer ("ZEONOR" manufactured by ZEON CORPORATION, glass transition temperature: 123° C.) was prepared.

As an additive, an ultraviolet absorber ("LA-31RG" manufactured by ADEKA CORPORATION) was prepared.

93 parts by weight of the cycloolefin resin and 7 parts of the ultraviolet absorber were melted and kneaded in a biaxial extruder. The mixture was extruded therefrom and the resulting strand was molded with a pelletizer to obtain a pellet-shaped thermoplastic resin A.

The cycloolefin resin was prepared as it is as a thermoplastic resin B.

(Production of Optical Film)

An optical film was produced as in the description for the above-mentioned embodiments using the production apparatus 1 including the feed block 4 illustrated in FIG. 4 to FIG. 8. Specifically, an optical film was produced in the following procedure.

As illustrated in FIG. 4, the thermoplastic resin A was supplied to the first resin flow channel 11 of the feed block 4 through the first melted resin supply system 2, and the thermoplastic resin B was supplied to the second resin flow channel 12 of the feed block 4 through the second melted resin supply system 3. Then, the thermoplastic resin A and the thermoplastic resin B were supplied from the feed block 4 to the die 5. At this time, the angles of the vanes 14 and 15 were fixed in the feed block 4. The positions of the deckles 23a and 24a were set such that the deckle opening degree becomes a small value. Herein, the deckle opening degree refers to the size of the width of the flow channel through which the melted resin can flow in the rectangular portion 21a or 22a into which the deckle 23a or 24a is inserted as illustrated in FIG. 6. Usually, the larger the deckle opening degree is, the larger the flowing amount of the melted resin becomes. By supplying the thermoplastic resin A and the thermoplastic resin B from such a feed block 4 to the die 5, the die 5 was filled with a layer of the thermoplastic resin A in a melted state, and a layer of the thermoplastic resin B in a melted state disposed on both sides in the thickness direction and on both sides in the width direction of the layer of the thermoplastic resin A.

Thereafter, as illustrated in FIG. 4, the thermoplastic resin A and the thermoplastic resin B were extruded from the die 5 into a film shape, and cooled by the casting roll 6a, the first cooling roll 6b, and the second cooling roll 6c. Thus, the optical film 100 was obtained. Extrusion conditions were a die lip gap of 0.5 mm, a die width of 1700 mm, a melted resin temperature of 260° C., a casting roll temperature of 100° C., and a cooling roll temperature of 90° C.

The obtained optical film 100 included, as illustrated in FIG. 1, the high concentration portion 110 containing the thermoplastic resin A in the center in the width direction and the thickness direction, and the low concentration portion 120 containing the thermoplastic resin B so as to cover the high concentration portion 110. Therefore, the optical film 100 produced in Example 1 included the low concentration portion 120 on both the front-side region 111 and the back-side region 112 of the high concentration portion 110 in the thickness direction of the optical film 100. The optical film 100 included the low concentration portion 120 on both the left-side region 113 and the right-side region 114 of the high concentration portion 110 in the width direction of the optical film 100.

This optical film 100 was evaluated by the above-mentioned method.

Example 2

An optical film was produced in the same manner as in Example 1, except that the positions of the deckles in the feed block were adjusted to make the deckle opening degree larger than that in Example 1. The obtained optical film included, as illustrated in FIG. 1, the high concentration portion 110 containing the thermoplastic resin A in the center in the width direction and the thickness direction, and the low concentration portion 120 containing the thermoplastic resin B so as to cover the high concentration portion 110. Therefore, the optical film 100 produced in Example 2 included the low concentration portion 120 on both the front-side region 111 and the back-side region 112 of the high concentration portion 110 in the thickness direction of the optical film 100. The optical film 100 included the low concentration portion 120 on both the left-side region 113 and the right-side region 114 of the high concentration portion 110 in the width direction of the optical film 100.

This optical film 100 was evaluated by the above-mentioned method.

Example 3

An optical film was produced in the same manner as in Example 1, except that the positions of the deckles in the feed block were adjusted to make the deckle opening degree larger than that in Example 2. The obtained optical film included, as illustrated in FIG. 1, the high concentration portion 110 containing the thermoplastic resin A in the center in the width direction and the thickness direction, and the low concentration portion 120 containing the thermoplastic resin B so as to cover the high concentration portion 110. Therefore, the optical film 100 produced in Example 3 included the low concentration portion 120 on both the front-side region 111 and the back-side region 112 of the high concentration portion 110 in the thickness direction of the optical film 100. The optical film 100 included the low concentration portion 120 on both the left-side region 113 and the right-side region 114 of the high concentration portion 110 in the width direction of the optical film 100.

This optical film 100 was evaluated by the above-mentioned method.

Comparative Example 1

An optical film was produced in the same manner as in Example 1, except that the deckle opening degree was set to zero so that the thermoplastic resin B was not supplied from the sub-pipe channels 21 and 22 of the feed block 4 illustrated in FIG. 6. The obtained optical film was a multilayer film including, in the thickness direction, the low concentration portion, the high concentration portion, and the low concentration portion in this order, and the high concentration portion was exposed on the end surfaces at the ends in the width direction of the optical film.

This optical film was evaluated by the above-mentioned method.

Results of Examples 1 to 3 and Comparative Example 1

The results of Examples 1 to 3 and Comparative Example 1 described above are shown in the following Table 1. In Table 1, abbreviations mean as follows.

Resin A: Thermoplastic resin A
Resin B: Thermoplastic resin B
COP: Cycloolefin resin
Front-side region: Region on the front side of the high concentration portion in the thickness direction of the optical film (Region 111 in FIG. 1)

Back-side region: Region on the back side of the high concentration portion in the thickness direction of the optical film (Region 112 in FIG. 1)

Left-side region: Region on the left side of the high concentration portion in the thickness direction of the optical film (Region 113 in FIG. 1)

Right-side region: Region on the right side of the high concentration portion in the thickness direction of the optical film (Region 114 in FIG. 1)

to produce the optical film by a melt extrusion method without causing volatilization of the ultraviolet absorber as the additive.

Example 4

The optical film obtained in Example 1 was supplied as a primary film to a tenter stretching machine in which a rail pattern was previously adjusted, and subjected to a stretching process. Then, both ends of the film were cut off to obtain a long-length stretched film with a width of 1250 mm. Conditions of this stretching were a stretching ratio of 1.5 times, a stretching temperature of 140° C., and a drawing tension (outlet tension) of T=300 N/m. The stretching direction of this stretching was set to an oblique direction of the primary film so that a slow axis is expressed in the stretched film in a direction that forms an angle of orientation angle $\theta=45°$ with respect to the width direction of the stretched film. Herein, the oblique direction refers to a direction that is the in-plane direction of a film and neither parallel to nor vertical to the width direction of a film. The stretched film

TABLE 1

[results of Examples 1-3 and Comparative Example 1]

| | | | Example 1 | Example 2 | Example 3 | Comparative Example 1 |
|---|---|---|---|---|---|---|
| Thickness direction | | | | | | |
| Low concentration portion (front-side region) | Resin B | Resin<br>Additive | COP<br>N/A | COP<br>N/A | COP<br>N/A | COP<br>N/A |
| High concentration portion | Resin A | Resin<br>Additive (concentration) | COP<br>LA-31RG<br>(7%) | COP<br>LA-31RG<br>(7%) | COP<br>LA-31RG<br>(7%) | COP<br>LA-31RG<br>(7%) |
| Low concentration portion (back-side region) | Resin B | Resin<br>Additive | COP<br>N/A | COP<br>N/A | COP<br>N/A | COP<br>N/A |
| Width direction | | | | | | |
| Low concentration portion (left-side region) | Resin B | Resin<br>Additive | COP<br>N/A | COP<br>N/A | COP<br>N/A | —<br>N/A |
| High concentration portion | Resin A | Resin<br>Additive (concentration) | COP<br>LA-31RG<br>(7%) | COP<br>LA-31RG<br>(7%) | COP<br>LA-31RG<br>(7%) | COP<br>LA-31RG<br>(7%) |
| Low concentration portion (right-side region) | Resin B | Resin<br>Additive | COP<br>N/A | COP<br>N/A | COP<br>N/A | —<br>N/A |
| Deckle opening degree | | | Small | Mediate | Large | Zero |
| Side width | | (mm) | 35 | 60 | 90 | 0 |
| Width of high concentration portion | | (mm) | 1530 | 1480 | 1420 | 1600 |
| Thickness of high concentration portion in measurement region | Average thickness | (μm) | 38.0 | 40.5 | 42.3 | 36.9 |
| | Max | (μm) | 41.6 | 43.2 | 45.0 | 37.9 |
| | Min | (μm) | 35.9 | 36.5 | 32.5 | 36.3 |
| | Fluctuation | (μm) | ±3.6 | ±4.0 | ±9.8 | ±1.0 |
| Average thickness $T_U$ of low concentration portion | | (μm) | 18 | 5 | 17 | 16 |
| Average thickness $T_D$ of low concentration portion | | (μm) | 18 | 5 | 15 | 17 |
| Average thickness of film | | (μm) | 70 | 50 | 70 | 70 |
| Line contamination | | | Good | Good | Good | Poor |
| Die line | | | Good | Good | Good | Poor |
| Dent | | | Good | Good | Good | Poor |

Discussions on Examples 1 to 3 and Comparative Example 1

In Comparative Example 1, since the high concentration portion was exposed on the end surfaces at the ends in the width direction of the film, the ultraviolet absorber was volatilized, causing all of line contamination, die lines, and dents. On the contrary, nevertheless the optical films according to Examples 1 to 3 were produced by a melt extrusion method, they had no line contamination, die lines, or dents. This demonstrated that in Examples 1 to 3, it was possible obtained in this manner was evaluated by the above-mentioned method. The result is shown in Table 2 illustrated below.

The obtained stretched film had good evaluation on die lines and dents, and the concentration of the additive in the resin A was not changed before and after stretching.

TABLE 2

[result of Example 4]

|  |  |  |  |  | Example 4 |
|---|---|---|---|---|---|
|  |  | Thickness direction |  |  |  |
| Conditions for production of optical film | Low concentration portion (front-side region) | Resin B | Resin Additive |  | COP N/A |
|  | High concentration Portion | Resin A | Resin Additive (concentration) |  | COP LA-31RG (7%) |
|  | Low concentration portion (back-side region) | Resin B | Resin Additive |  | COP N/A |
|  |  | Width direction |  |  |  |
|  | Low concentration portion (left-side region) | Resin B | Resin Additive |  | COP N/A |
|  | High concentration Portion | Resin A | Resin Additive (concentration) |  | COP LA-31RG (7%) |
|  | Low concentration portion (right-side region) | Resin B | Resin Additive |  | COP N/A |
|  | Deckle opening degree |  |  |  | Small |
| Primary film | Side width |  |  | (mm) | 35 |
|  | Width of high concentration portion |  |  | (mm) | 1530 |
|  | Thickness of high concentration portion in measurement region | Average thickness | (µm) |  | 38.0 |
|  |  | Max | (µm) |  | 41.6 |
|  |  | Min | (µm) |  | 35.9 |
|  |  | Fluctuation | (µm) |  | ±3.6 |
|  | Average thickness $T_U$ of low concentration portion |  |  | (µm) | 18 |
|  | Average thickness $T_D$ of low concentration portion |  |  | (µm) | 18 |
|  | Average thickness of film |  |  | (µm) | 70 |
|  | Line contamination |  |  |  | Good |
|  | Die line |  |  |  | Good |
|  | Dent |  |  |  | Good |
| Stretched film | Thickness of high concentration portion in measurement region | Average thickness | (µm) |  | 25.0 |
|  |  | Max | (µm) |  | 27.7 |
|  |  | Min | (µm) |  | 23.9 |
|  |  | Fluctuation | (µm) |  | ±2.7 |
|  | Average thickness $T_U$ of low concentration portion |  |  | (µm) | 12 |
|  | Average thickness $T_D$ of low concentration portion |  |  | (µm) | 12 |
|  | Average thickness of film |  |  | (µm) | 47 |
|  | Temperature change of additive in resin A before and after stretching |  |  |  | N/A |
|  | Line contamination |  |  |  | Good |
|  | Die line |  |  |  | Good |
|  | Dent |  |  |  | Good |

DESCRIPTION OF NUMERALS 1 production apparatus
2 first melted resin supply system
2a hopper
2b extruder
2c gear pump
2d filter
2e pipe
3 second melted resin supply system
3a hopper
3b extruder
3c gear pump
3d filter
3e pipe
4 feed block
5 die
6a casting roll
6b first cooling roll
6c second cooling roll
7 conveyance roll
8 winding roll
11 first resin flow channel
11a pipe channel
11b widened portion
11c outlet on downstream side of widened portion
12 second resin flow channel
12a pipe channel
12b branch pipe channel
12c widened portion
12d outlet on downstream side of widened portion
13b branch pipe channel
13c widened portion
13d outlet on downstream side of widened portion
14 vane
14a shaft portion of vane 14b V-shaped portion of vane
14c first side surface of vane
14d second side surface of vane
14e ridge portion of vane
14f hexagonal portion
15 vane
15a shaft portion of vane
15b V-shaped portion of vane
15c first side surface of vane
15d second side surface of vane
15e ridge portion of vane
15f hexagonal portion
16 delivery pipe channel
21 sub-pipe channel
21a rectangular portion
22 sub-pipe channel
22a rectangular portion
23 deckle mechanism
23a deckle
23b male screw portion
23c nut portion
23d female screw portion
23e cavity portion
24 deckle mechanism
24a deckle
24b male screw portion
24c nut portion
24d female screw portion
24e cavity portion
100 optical film
110 high concentration portion
110U, 110D, 110R and 110L surfaces of high concentration portions
111 front-side region of high concentration portion in the thickness direction of optical film
112 back-side region of high concentration portion in the thickness direction of optical film
113 left-side region of high concentration portion in the width direction of optical film
114 right-side region of high concentration portion in the width direction of optical film
115-118 regions which are not either both sides in the thickness direction of optical film or both sides in the width direction of optical film
120 low concentration portion
130 region of high concentration portion having a thickness of average thickness of high concentration portion ±5 μm of optical film
200 trimmed film
201 and 202 end surfaces at the ends in the width direction of trimmed film

The invention claimed is:

1. A method for producing a trimmed film, comprising the steps of:
producing an optical film containing an additive; and,
cutting off both end portions in a width direction of the optical film; wherein
the optical film comprises a high concentration portion containing the additive; a low concentration portion containing the additive at a concentration lower than the high concentration portion; and boundary portions between the high concentration portion and the low concentration portion,
the low concentration portion is provided on both sides of the high concentration portion in a thickness direction of the optical film,
the low concentration portion is provided on both sides of the high concentration portion in the width direction of the optical film, and
the boundary portions are provided with the end portions on both sides of the high concentration portion in the width direction of the optical film, wherein
the step of cutting both end portions in the width direction of the optical film comprises cutting off the boundary portions from the optical film to form end surfaces on which the high concentration portion is exposed, and
wherein the optical film has a region where the high concentration portion has a thickness of "average thickness of the high concentration portion ±5 μm" in a continuous section having a length of 500 mm or more in the width direction of the optical film.

2. The method for producing the trimmed film according to claim 1, wherein the step of producing the optical film comprises producing the optical film by a melt extrusion method.

3. The method for producing the trimmed film according to claim 1, wherein the low concentration portion of the optical film is exposed on surfaces in the thickness direction and surfaces in the width direction of the optical film.

4. The method for producing the trimmed film according to claim 1, wherein
the high concentration portion contains a thermoplastic resin A containing the additive, and
the low concentration portion contains a thermoplastic resin B containing the additive at a concentration lower than the concentration of the additive in the thermoplastic resin A.

5. The method for producing the trimmed film according to claim 1, wherein
surfaces of the high concentration portion in the thickness direction of the optical film are covered with the low concentration portion, and
surfaces of the high concentration portion in the width direction of the optical film are covered with the low concentration portion.

6. The method for producing the trimmed film according to claim 1, wherein the optical film is a long-length film.

7. The method for producing the trimmed film according to claim 1, wherein the additive is an ultraviolet absorber.

8. The method for producing the trimmed film according to claim 1, wherein the trimmed film is a primary film for tenter stretching.

9. The method for producing the trimmed film according to claim 1, wherein the step of producing the optical film comprises the step of extruding a thermoplastic resin A containing an additive and a thermoplastic resin B containing the additive at a concentration lower than the thermoplastic resin A into a film shape from a die filled with a layer of the melted thermoplastic resin A and a layer of the melted thermoplastic resin B, the melted thermoplastic resin B being provided on both sides in a thickness direction and both sides in a width direction of the layer of the thermoplastic resin A.

10. A method for producing a stretched film, comprising the steps of:
supplying the trimmed film that is produced by the method according to claim 1 to a tenter stretching machine, and stretching the trimmed film to obtain a stretched film.

11. The method for producing the stretched film according to claim 10, wherein the content of the additive in the stretched film is approximately constant along a width direction.

12. The method for producing the stretched film according to claim 10, wherein the high concentration portion contains a thermoplastic resin A including 3% by weight or more and 10% by weight or less of the additive.

13. The method for producing the trimmed film according to claim 1, wherein the step of cutting both end portions in the width direction of the optical film produces the low concentration portion and the high concentration portion having equal widths.

\* \* \* \* \*